(12) United States Patent
Himann et al.

(10) Patent No.: US 11,544,859 B2
(45) Date of Patent: Jan. 3, 2023

(54) DATA PROCESSING SYSTEMS AND METHODS USING SIX-DIMENSIONAL DATA TRANSFORMATIONS

(71) Applicant: 1974266 AB Ltd (TAGDit), Calgary (CA)

(72) Inventors: Jode Robert Alan Himann, Calgary (CA); Brett Joseph Teeple, Calgary (CA)

(73) Assignee: 1974266 AB LTD (TAGDIT), Calgary (CA)

( * ) Notice: Subject to any disclaimer, the term of this patent is extended or adjusted under 35 U.S.C. 154(b) by 0 days.

(21) Appl. No.: 17/468,792

(22) Filed: Sep. 8, 2021

(65) Prior Publication Data

US 2022/0020163 A1    Jan. 20, 2022

Related U.S. Application Data

(63) Continuation of application No. 17/065,681, filed on Oct. 8, 2020, now Pat. No. 11,158,070.

(60) Provisional application No. 62/924,717, filed on Oct. 23, 2019.

(51) Int. Cl.
*G06T 7/33* (2017.01)
*G06T 15/10* (2011.01)
*G06T 19/20* (2011.01)

(52) U.S. Cl.
CPC ............... *G06T 7/33* (2017.01); *G06T 15/10* (2013.01); *G06T 19/20* (2013.01)

(58) Field of Classification Search
CPC .......... G06T 7/33; G06T 15/10; G06T 19/20; G06T 11/206; G06T 17/00; G06T 2219/2016; G06T 2219/2021
See application file for complete search history.

(56) References Cited

U.S. PATENT DOCUMENTS

| | | |
|---|---|---|
| 2010/0158353 A1 | 6/2010 | Kim et al. |
| 2018/0121757 A1 | 5/2018 | Rutman et al. |
| 2018/0299556 A1 | 10/2018 | Marcus et al. |
| 2019/0287297 A1 | 9/2019 | Abhiram et al. |
| 2020/0061769 A1 | 2/2020 | Liu et al. |

OTHER PUBLICATIONS

Office Action dated May 21, 2021 in respect of U.S. Appl. No. 17/065,681.

*Primary Examiner* — David T Welch
(74) *Attorney, Agent, or Firm* — Bereskin & Parr LLP/S.E.N.C.R.L., s.r.l.

(57) ABSTRACT

A system, method and computer program product for generating a digital image. An initial image object defined in an initial coordinate system is determined from an image generation input. The initial coordinate system has at most four dimensions. At least one initial image transformation to be performed on the initial image object is also determined from the image generation input. Each initial image transformation is mapped to a corresponding six-dimensional transformation defined in a six-dimensional coordinate system. An updated image is calculated by applying the six-dimensional set of image transformations to the at least one initial image object. The updated image is then rendered on a user display.

26 Claims, 26 Drawing Sheets

```python
import turtle
import sys def generate(n, result='[X]'):
    for _ in range(n):
        # rule #2
        result = result.replace('F', 'FF')
        # rule #1
        result = result.replace('X', 'F-[[X]+X]+F[+FX]-X')

return result
```

FIG. 5

```python
def draw(cmds, size=2):
    stack = []
    for cmd in cmds:
        if cmd=='F':
            turtle.forward(size)
        elif cmd=='-':
            turtle.left(25)
        elif cmd=='+':
            turtle.right(25)
        elif cmd=='X':
            pass
        elif cmd=='[':
            stack.append((turtle.position(), turtle.heading()))
        elif cmd==']':
            position, heading = stack.pop()
            turtle.penup()
            turtle.setposition(position)
            turtle.setheading(heading)
            turtle.pendown()
        else:
            raise ValueError('Unknown Cmd: {}'.format(ord(cmd)))
    turtle.update()

def setup():
    turtle.hideturtle()
    turtle.tracer(1e3,0)
    turtle.left(90)
    turtle.penup()
    turtle.goto(0,-turtle.window_height()/2)
    turtle.pendown()

setup()
plant = generate(6)
draw(plant, 2)
turtle.exitonclick()
```

FIG. 6

```
from gturtle import *
from tjaddons import makeRainbowColor

# Choose an angle between 10 and 90
ANGLE = 40 def makeTree(s, depth = 4):
    setPenColor( makeRainbowColor(depth) )
    if s < 64:
        penWidth(1)
    else:
        penWidth(2)
    forward(s)
    if s >= 1:
        x = getX()
        y = getY()
        hd = heading()
        left(ANGLE)
        makeTree(2*s/3, depth+1)
        setPos(x, y)
        heading(hd)
        right(ANGLE)
        makeTree(2*s/3, depth+1)

MAIN ###
makeTurtle()
hideTurtle()
clear("black")
setPos(0, -300)
makeTree(200)
```

FIG. 8

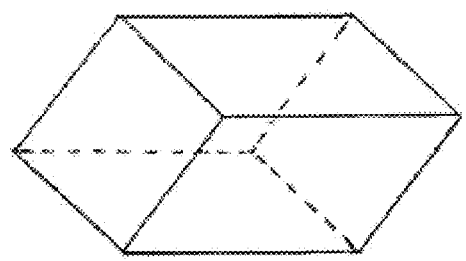
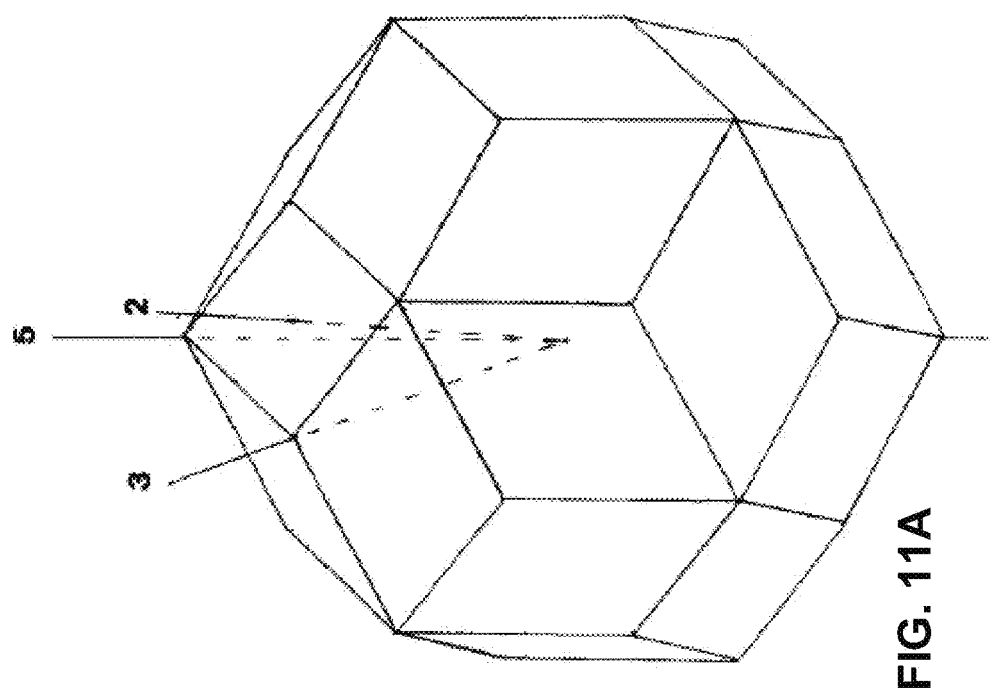
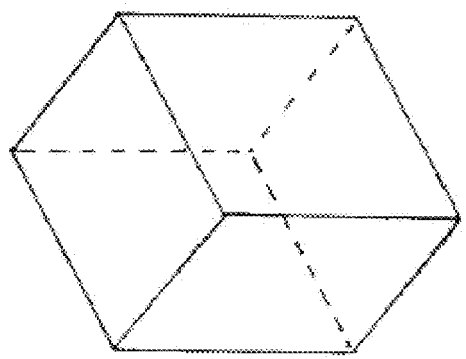

```
# Random 2D Slice Of 4D Mandelbrot Fractal
# FB - 20110523i
"""Random 2D Slice Of 4D Mandelbrot Fractal.
                            Modified by Symion 2011
    Now works with Visual Python v5.40.
    Produce 2D slice of 4D Mandelbrot Fractal and Map it in 3D!

Visual Python Controls:
    Click Left Mouse Key = Navigate
    Press Right Mouse Key = Spin
    Press Both Keys = Zoom
    q = Point size - 1
    w = Point size + 1
    e = Point shape + 1
    r = Scene Alignment
"""
vp_flag = 1 if vp_flag == 0:
    from visual import *
else:
    import random
    from math import *
    from PIL import Image
imgx = 512
imgy = 512
forge = 0
pcc = 0
pii = 0
psize = 3
pshape = 0 if vp_flag == 0:
    scene.width=imgx
    scene.height=imgy
    image = [points(size=psize, shape="square")]
    forward = vector(scene.forward)
    print "Number of Points objects: {0}".format(len(image))
else:
    image = Image.new("RGB", (imgx, imgy))

print __doc__
# drawing area (xa < xb & ya < yb)
xa = -2.0
xb = 2.0
ya = -2.0
yb = 2.0
maxIt = 32 # max number of iterations allowed
maxIt = maxIt / 2.0
if True:
    # random rotation angles to convert 2d plane to 4d plane
    xy = random.random() * 2.0 * pi
    xz = random.random() * 2.0 * pi
    xw = random.random() * 2.0 * pi
    yz = random.random() * 2.0 * pi
    yw = random.random() * 2.0 * pi
    zw = random.random() * 2.0 * pi
```

FIG. 15A

```
else:
    # default rotation angles
    xy=1.3536589728
    xz=2.30808965705
    xw=3.50029464114
    yz=3.37449518258
    yw=4.23401560176
    zw=2.44695022478 sxy = sin(xy)
cxy = cos(xy)
sxz = sin(xz)
cxz = cos(xz)
sxw = sin(xw)
cxw = cos(xw)
syz = sin(yz)
cyz = cos(yz)
syw = sin(yw)
cyw = cos(yw)
szw = sin(zw)
czw = cos(zw)

origx = (xa + xb) / 2.0
origy = (ya + yb) / 2.0 for ky in range(imgy):
    b = ky * (yb - ya) / (imgy - 1) + ya
    for kx in range(imgx):
        a = kx * (xb - xa) / (imgx - 1) + xa
        x = a
        y = b
        z = 0 # c = 0
        w = 0 # d = 0
        # 4d rotation around center of the plane
        x = x - origx
        y = y - origy
        x0 = x * cxy - y * sxy
        y = x * sxy + y * cxy
        x = x0 # xy-plane rotation
        x0 = x * cxz - z * sxz
        z = x * sxz + z * cxz
        x = x0 # xz-plane rotation
        x0 = x * cxw - z * sxw
        w = x * sxw + z * cxw
        x = x0 # xw-plane rotation
        y0 = y * cyz - z * syz
        z = y * syz + z * cyz
        y = y0 # yz-plane rotation
        y0 = y * cyw - w * syw
        w = y * syw + w * cyw
        y = y0 # yw-plane rotation
        z0 = z * czw - w * szw
        w = z * szw + w * czw
        z = z0 # zw-plane rotation
        x = x + origx
        y = y + origy
```

FIG. 15B

```
    forge:
        for i in range(maxIt):
            # iteration using quaternion numbers
            x0 = x * x - y * y - z * z - w * w + a
            y = 2.0 * x * y + b
            z = 2.0 * x * z
            w = 2.0 * x * w
            x = x0
            s = x * x + y * y + z * z + w * w # 4d absolute value squared
            if s > 4.0:
                break
    else:
        for i in range(maxIt):
            # iteration using hyper-complex numbers
            x0 = x * x - y * y - z * z - w * w + a
            y0 = 2.0 * x * y - 2.0 * z * w + b
            z0 = 2.0 * x * z - 2.0 * y * w
            w = 2.0 * x * w + 2.0 * z * y
            x = x0
            y = y0
            z = z0
            s = x * x + y * y + z * z + w * w # 4d absolute value squared
            if s > 4.0:
                break
    pcc += 1
    pii += 1
    if (i%maxIt) != 0:
        if vp_flag == 0:
            if len(image[-1].pos) > 9999:
                image.append(points(size=psize, shape="square"))
                print "Number of Points objects: {0}".format(len(image))
            c = (i/maxIt, i/maxIt, i/maxIt)
            image[-1].append((kx-256, ky-256, i/maxIt))
            image[-1].color[-1] = c
        else:
            image.putpixel((kx, ky), (i % 4 * 64, i % 8 * 32, i % 16 * 16))
if vp_flag == 0:
    scene.autoscale=False
    scene.range=mag(scene.mouse.camera)/sqrt(3)
    scene.visible = True
else:
    image.save("4D Mandelbrot Fractal.png", "PNG")
    image.show()
print "Finished!"
print "{0} / {1} = {2}".format(pcc, pii, pcc / pii)
mess = "Base Set:\nxy={0}, xz={1}, xw={2}, yz={3}, yw={4}, zw={5}"
print mess.format(xy, xz, xw, yz, yw, zw)
```

FIG. 15C

```
if vp_flag == 0:
    while 1:
        if scene.mouse.events>0:
            mk = scene.mouse.getevent()
            if mk.release == "left":
                scene.center = mk.pos
        elif scene.kb.keys:
            km = scene.kb.getkey()
            if km in ["x", "X"]:
                break
            elif km in ["w"]:
                psize = psize%50
                psize += 1
                for a in image:
                    a.size = psize
            elif km in ["q"]:
                psize -= 1
                if psize<1:
                    psize = 50
                for a in image:
                    a.size = psize
            elif km in ["e"]:
                pshape = (pshape+1)%2
                for a in image:
                    a.shape = ["square","round"][pshape]
            elif km in ["r"]:
                scene.forward = forward
```

```
# Decorate the front entrance slab
text(pos=(0, 0.77*h, R+d/2), text="Dr Rain", color=color.yellow,
     depth=0.3, height=0.7, align="center")

# Display extruded text
text( pos=(2.0,-0.3*sin(pi/10),-2.0), text="A", height=2.0, depth=0.5,
      color=(0,0,1,0), up=(0,cos(pi/3.4),-sin(pi/3.4)), axis=(0.5,0,1))
text( pos=(3.2,0,-2), text="B", height=1.5, depth=0.5,
      color=(1,0,1,0,0), axis=(1,0,0,3))
text( pos=(5.0,-0.5*sin(pi/10),-1.5), text="C", height=2.0, depth=0.5,
      color=(1,0,0,1,0), axis=(1,0,0,6), up=(0,cos(pi/8),sin(pi/8)) )

while True:
    # Toggle roam option
    if scene.mouse.events:
        m = scene.mouse.getevent()
        if m.press or m.drag:
            roam = True
        elif m.release or m.drop:
            roam = False

# If in roaming mode, change center and forward according to mouse position
    if roam:
        ray = scene.mouse.ray
        if abs(dot(ray,scene.forward)) < maxcosine: # do something only if outside crosshairs
            newray = norm(vector(ray.x, 0, ray.z))
            angle = arcsin(dot(cross(scene.forward,newray),scene.up))
            newforward = rotate(scene.forward, axis=scene.up, angle=angle/30)
            scene.center = scene.mouse.camera+newforward*mag(scene.center-scene.mouse.camera)
            scene.forward = newforward
            scene.center = scene.center+scene.forward*ray.y/2.

# Roll the log
    theta = theta + omega*dt
    log.x = log.x+v*dt
    log.rotate(angle=omega*dt)
    if log.x >= wide:
        v = -v0
        omega = -v/rlog
        if rightstop.color == color.red:
            rightstop.color = color.blue
        else:
            rightstop.color = color.red
    if log.x <= -wide:
        v = +v0
        omega = -v/rlog
        if leftstop.color == color.red:
            leftstop.color = color.blue
        else:
            leftstop.color = color.red

# Move the cloud
    cloud.rotate(angle=omegacloud*dt, origin=(0,0,0), axis=(0,1,0))

# Run the ball up and down
    ball.pos.y = ball.pos.y+vball*dt
    ball.rotate(angle=ballangle, axis=(0,1,0), origin=(0,0,0))
    if ball.pos.y >= yt:
        vball = -vball
        ballangle = -ballangle
    if ball.pos.y <= yt:
        vball = +vball
        ballangle = -ballangle

# Move the smoke rings
    for i in range(nrings):
```

FIG. 17D

```
        # Raise the smoke rings
        smoke[i].pos = smoke[i].pos+vector(0,dy,0)
        smoke[i].radius = smoke[i].radius+(dr/spacing)*dy
        smoke[i].thickness = smoke[i].thickness-(dthick/spacing)*dy
    y = y+dy
    if y >= spacing:
        # Move top ring to the bottom
        y = 0
        smoke[top].pos = (x0, y0, z0)
        smoke[top].radius = r0
        smoke[top].thickness = thick
        top = top-1
    if top < 0:
        top = Nrings-1

# Update the analog clock on the back slab
    clock.update()

rate(30)
```

FIG. 17E

DATA PROCESSING SYSTEMS AND METHODS USING SIX-DIMENSIONAL DATA TRANSFORMATIONS

CROSS-REFERENCE TO RELATED APPLICATION

This application is a continuation of U.S. patent application Ser. No. 17/065,681 filed Oct. 8, 2020, which claims the benefit of U.S. Provisional Patent Application No. 62/924,717 filed Oct. 23, 2019, the contents of both of which are incorporated herein by reference.

FIELD

The described embodiments relate to data processing systems and methods, and in particular to systems and methods that conduct data processing operations using transformations in an alternate dimensional space.

BACKGROUND

As computer systems and data processing become more and more ubiquitous in society and daily life, continued improvements in data processing techniques are highly desirable. As data processing operations become more complex, and involve ever greater volumes of data, techniques for efficiently analyzing and processing large volumes of data are increasingly important.

Computer graphics can be used to process and display image data for a user. Computer graphics systems may generate image data for various different applications, such as data analysis, modelling, movie, video gaming, augmented reality, and virtual reality applications. As the level of detail presented in these applications continues to increase, the volume of data that needs to be analyzed and processed continues to increase.

Augmented reality (AR) and virtual reality (VR) applications in particular often require high volumes of complex data processing. As content is created for these applications with greater levels of resolution and faster frame rates, efficiency of image data processing may become paramount in order for the content to be displayed properly.

INTRODUCTION

The following is not an admission that anything discussed below is part of the prior art or part of the common general knowledge of a person skilled in the art.

In an aspect of this disclosure, systems and methods for data processing are provided that may enable data sets, such as image data sets, to be processed in a faster and more efficient manner. Data sets that are defined in an initial dimensional space can be manipulated in a six-dimensional space with the results projected back to the initial dimensional space (or another desired space). This may allow data to be generated and/or analyzed more efficiently, e.g. in order to generate computer graphic data or virtual reality data, or to generate data models of features of interest.

An image generation process can perform a set of image transformations on input image data where the image transformations are defined within a six-dimensional space. The output from the image transformations can then be projected back into the three-dimensional or four-dimensional space required in order for the image data to be output. The projected data can then be rendered and presented to a user. This may provide faster and more efficient image generation, as the transformations within the six dimensional space may be calculated more efficiently than performing corresponding transformations directly within the initial coordinate system.

In accordance with this aspect of the disclosure, there is provided a method of generating a digital image, the method comprising: receiving an image generation input for the digital image, wherein an initial image is determinable from the image generation input, the initial image comprising at least one initial image object defined in a first dimensional coordinate system, wherein the first dimensional coordinate system comprises at most four dimensions; determining, from the image generation input, a set of image transformations to be performed on the at least one initial image object, the set of image transformations comprising at least one initial image transformation defined in the first dimensional coordinate system; defining a six-dimensional set of image transformations by mapping each initial image transformation in the set of image transformations to a corresponding six-dimensional transformation, wherein each six-dimensional transformation is defined in a six-dimensional coordinate system; calculating an updated image by applying the six-dimensional set of image transformations to the at least one initial image object; and rendering the updated image on a user display device.

In some examples, the first dimensional coordinate system may include fewer than four dimensions, and mapping each initial image transformation in the set of image transformations to the corresponding six-dimensional transformation may include: mapping each initial image transformation into a corresponding four-dimensional transformation that is defined in a homogenous four-dimensional coordinate system; and mapping each four-dimensional transformation to the corresponding six-dimensional transformation.

In some examples, the dimensions of the six-dimensional space may be determined using bivectors calculated as the exterior products of the unit coordinate vectors of the four-dimensional coordinate system.

In some examples, the six-dimensional coordinate system may be a six-dimensional metric space.

In some examples, mapping each initial image transformation in the set of image transformations to the corresponding six-dimensional transformation may include: mapping each initial image transformation into an initial six-dimensional transformation that is defined in an initial six-dimensional coordinate system; and mapping each initial six-dimensional transformation to the corresponding six-dimensional transformation by converting the initial six-dimensional coordinate system to the six-dimensional metric space.

In some examples, the first dimensional coordinate system may include fewer than four dimensions, and mapping each initial image transformation into the initial six-dimensional transformation may include: mapping each initial image transformation into a corresponding four-dimensional transformation that is defined in a homogenous four-dimensional coordinate system; and mapping each four-dimensional transformation to the initial six-dimensional transformation.

In some examples, the dimensions of the initial six-dimensional transformation may be defined using null vectors that are determined using bivectors calculated as the exterior products of the unit coordinate vectors of the four-dimensional coordinate system.

In some examples, the dimensions of the six-dimensional transformations may be defined using unit vectors that are calculated using the null vectors dimensions of the initial six-dimensional coordinate system.

In some examples, the set of image transformations may be determined to be a sequence of image transformations, where the sequence of image transformations includes a plurality of image transformations and the sequence of image transformations defines a sequential order for the plurality of image transformations; and calculating the updated image may include: applying each of the six-dimensional transformations to the at least one initial image object in the sequential order defined by the image generation input.

In some examples, applying each of the six-dimensional transformations to the at least one initial image object may include: applying an initial six-dimensional transformation to the at least one initial image object, the initial six-dimensional transformation defined as a first image transformation in the sequential order; calculating an intermediate updated image, the intermediate updated image comprising the result of applying the six-dimensional transformation to the at least one initial image object; applying a subsequent six-dimensional transformation to the intermediate updated image, the subsequent six-dimensional transformation defined as the subsequent image transformation in the sequential order; and repeating the calculating and applying steps until the six-dimensional transformations corresponding to all of the transformations in the sequence of image transformations have been applied.

In some examples, the at least one initial image transformation may include at least one of a translation, a rotation, a perspective transformation, a shearing transformation, a Lorentz transformation, a pinch transformation, and a dilation transformation.

In some examples, the image generation input may define the set of image transformations.

In some examples, the image generation input may include the at least one initial image object; and determining the set of image transformations may include: analyzing the at least one initial image object to identify an image generation sequence for the at least one initial image object; determining a predicted sequence of subsequent modifications to the initial image object based on the identified image generation sequence; defining the set of image transformations using the predicted sequence of subsequent modifications.

In some examples, the image generation input may include a video object that includes a sequence of image objects including the at least one initial image object; and the image generation sequence may be determined from the sequence of image objects in the video object.

In an aspect of this disclosure, there is provided a computer program product comprising a non-transitory computer-readable storing computer executable instructions, the computer executable instructions for configuring a processor to perform a method of generating a digital image, wherein the method comprises: receiving an image generation input for the digital image, wherein an initial image is determinable from the image generation input, the initial image comprising at least one initial image object defined in a first dimensional coordinate system, wherein the first dimensional coordinate system comprises at most four dimensions; determining, from the image generation input, a set of image transformations to be performed on the at least one initial image object, the set of image transformations comprising at least one initial image transformation defined in the first dimensional coordinate system; defining a six-dimensional set of image transformations by mapping each initial image transformation in the set of image transformations to a corresponding six-dimensional transformation, wherein each six-dimensional transformation is defined in a six-dimensional coordinate system; calculating an updated image by applying the six-dimensional set of image transformations to the at least one initial image object; and rendering the updated image on a user display device.

In some examples, the first dimensional coordinate system may include fewer than four dimensions, and mapping each initial image transformation in the set of image transformations to the corresponding six-dimensional transformation may include: mapping each initial image transformation into a corresponding four-dimensional transformation that is defined in a homogenous four-dimensional coordinate system; and mapping each four-dimensional transformation to the corresponding six-dimensional transformation.

In some examples, the dimensions of the six-dimensional space may be determined using bivectors calculated as the exterior products of the unit coordinate vectors of the four-dimensional coordinate system.

In some examples, the six-dimensional coordinate system may be a six-dimensional metric space.

In some examples, mapping each initial image transformation in the set of image transformations to the corresponding six-dimensional transformation may include: mapping each initial image transformation into an initial six-dimensional transformation that is defined in an initial six-dimensional coordinate system; and mapping each initial six-dimensional transformation to the corresponding six-dimensional transformation by converting the initial six-dimensional coordinate system to the six-dimensional metric space.

In some examples, the first dimensional coordinate system may include fewer than four dimensions, and converting each initial image transformation into an initial six-dimensional transformation may include: mapping each initial image transformation into a corresponding four-dimensional transformation that is defined in a homogenous four-dimensional coordinate system; and mapping each four-dimensional transformation to the initial six-dimensional transformation.

In some examples, the dimensions of the initial six-dimensional transformation may be defined using null vectors that are determined using bivectors calculated as the exterior products of the unit coordinate vectors of the four-dimensional coordinate system.

In some examples, the dimensions of the six-dimensional transformations may be defined using unit vectors that are calculated using the null vectors dimensions of the initial six-dimensional coordinate system.

In some examples, the set of image transformations may be determined to be a sequence of image transformations, where the sequence of image transformations includes a plurality of image transformations and the sequence of image transformations defines a sequential order for the plurality of image transformations; and calculating the updated image may include: applying each of the six-dimensional transformations to the at least one initial image object in the sequential order defined by the image generation input.

In some examples, applying each of the six-dimensional transformations to the at least one initial image object may include: applying an initial six-dimensional transformation to the at least one initial image object, the initial six-dimensional transformation defined as a first image transformation in the sequential order; calculating an intermediate updated image, the intermediate updated image comprising the result of applying the six-dimensional transformation to the at least one initial image object; applying a subsequent six-dimensional transformation to the intermediate updated image, the subsequent six-dimensional transformation defined as the subsequent image transformation in the sequential order; and repeating the calculating and applying steps until the six-dimensional transformations corresponding to all of the transformations in the sequence of image transformations have been applied.

In some examples, the at least one initial image transformation may include at least one of a translation, a rotation, a perspective transformation, a shearing transformation, a Lorentz transformation, a pinch transformation, and a dilation transformation.

In some examples, the image generation input may define the set of image transformations.

In some examples, the image generation input may include the at least one initial image object; and determining the set of image transformations may include: analyzing the at least one initial image object to identify an image generation sequence for the at least one initial image object; determining a predicted sequence of subsequent modifications to the initial image object based on the identified image generation sequence; defining the set of image transformations using the predicted sequence of subsequent modifications.

In some examples, the image generation input may include a video object that includes a sequence of image objects including the at least one initial image object; and the image generation sequence may be determined from the sequence of image objects in the video object.

In accordance with an aspect of this disclosure, there is provided a data processing method comprising: receiving an initial data set, wherein the initial data set comprises at least one data object that is defined within a first dimensional space, the first dimensional space having at most four dimensions; receiving an data processing input for the initial data set, wherein the data processing input defines at least one operation to be performed on the at least one data object; determining, from the data processing input, a set of data transformations to be performed on the at least one data object, the set of data transformations comprising at least one initial data transformation defined in the first dimensional space; defining a six-dimensional set of data transformations by mapping each initial data transformation in the set of data transformations to a corresponding six-dimensional transformation, wherein each six-dimensional transformation is defined in a six-dimensional space; calculating an updated data set by applying the six-dimensional set of data transformations to the at least one data object; and storing updated data set as a processed data set in a non-transitory storage medium.

In some examples, the first dimensional space may include fewer than four dimensions, and mapping each initial data transformation in the set of data transformations to the corresponding six-dimensional transformation may include: mapping each initial data transformation into a corresponding four-dimensional transformation that is defined in a homogenous four-dimensional space; and mapping each four-dimensional transformation to the corresponding six-dimensional transformation.

In some examples, the dimensions of the six-dimensional space may be determined using bivectors calculated as the exterior products of the unit coordinate vectors of the four-dimensional coordinate system.

In some examples, the six-dimensional coordinate system may be a six-dimensional metric space.

In some examples, mapping each initial data transformation in the set of data transformations to the corresponding six-dimensional transformation may include: mapping each initial data transformation into an initial six-dimensional transformation that is defined in an initial six-dimensional coordinate system; and mapping each initial six-dimensional transformation to the corresponding six-dimensional transformation by converting the initial six-dimensional coordinate system to the six-dimensional metric space.

In some examples, the first dimensional space may include fewer than four dimensions, and mapping each initial data transformation in the set of data transformations into the initial six-dimensional transformation may include: mapping each initial data transformation into a corresponding four-dimensional transformation that is defined in a homogenous four-dimensional space; and mapping each four-dimensional transformation to the initial six-dimensional transformation.

In some examples, the dimensions of the initial six-dimensional transformation may be defined using null vectors that are determined using bivectors calculated as the exterior products of the unit coordinate vectors of the four-dimensional space.

In some examples, the dimensions of the six-dimensional transformations may be defined using unit vectors that are calculated using the null vectors dimensions of the initial six-dimensional coordinate system.

In some examples, the set of data transformations may be determined to be a sequence of data transformations, where the sequence of data transformations includes a plurality of data transformations and the sequence of data transformations defines a sequential order for the plurality of data transformations; and calculating the updated data set may include: applying each of the six-dimensional transformations to the at least one initial data object in the sequential order defined by the data processing input.

In some examples, applying each of the six-dimensional transformations to the at least one data image object may include: applying an initial six-dimensional transformation to the at least one data object, the initial six-dimensional transformation defined as a first data transformation in the sequential order; calculating an intermediate updated data set, the intermediate updated data set comprising the result of applying the six-dimensional transformation to the at least one data object; applying a subsequent six-dimensional transformation to the intermediate updated data set, the subsequent six-dimensional transformation defined as the subsequent image transformation in the sequential order; and repeating the calculating and applying steps until the six-dimensional transformations corresponding to all of the transformations in the sequence of data transformations have been applied.

In some examples, the data processing input may define the set of data transformations.

In some examples, the data processing input may include the at least one data object; and determining the set of data transformations may include: analyzing the at least one data object to identify an data generation sequence for the at least one data object; determining a predicted sequence of subsequent modifications to the data object based on the identified data generation sequence; defining the set of data transformations using the predicted sequence of subsequent modifications.

It will be appreciated that the aspects and embodiments may be used in any combination or sub-combination.

BRIEF DESCRIPTION OF THE DRAWINGS

The drawings included herewith are for illustrating various examples of articles, methods, and apparatuses of the teaching of the present specification and are not intended to limit the scope of what is taught in any way.

FIG. 5 is a screenshot of example pseudocode that may be used to generate image data in accordance with an embodiment;

FIG. 6 is a screenshot of example pseudocode that may be used to generate image data in accordance with an embodiment;

FIG. 8 is a screenshot of another example of pseudocode that may be used to generate image data in accordance with an embodiment;

FIGS. 11A-11C are example illustrations of tiling that may be used in projection methods in accordance with an embodiment;

FIGS. 15A-15D are screenshots of example pseudocode that may be used to generate image data in accordance with an embodiment;

FIGS. 17A-17E are screenshots of example pseudocode that may be used to generate image data in accordance with an embodiment;

Figure 1:
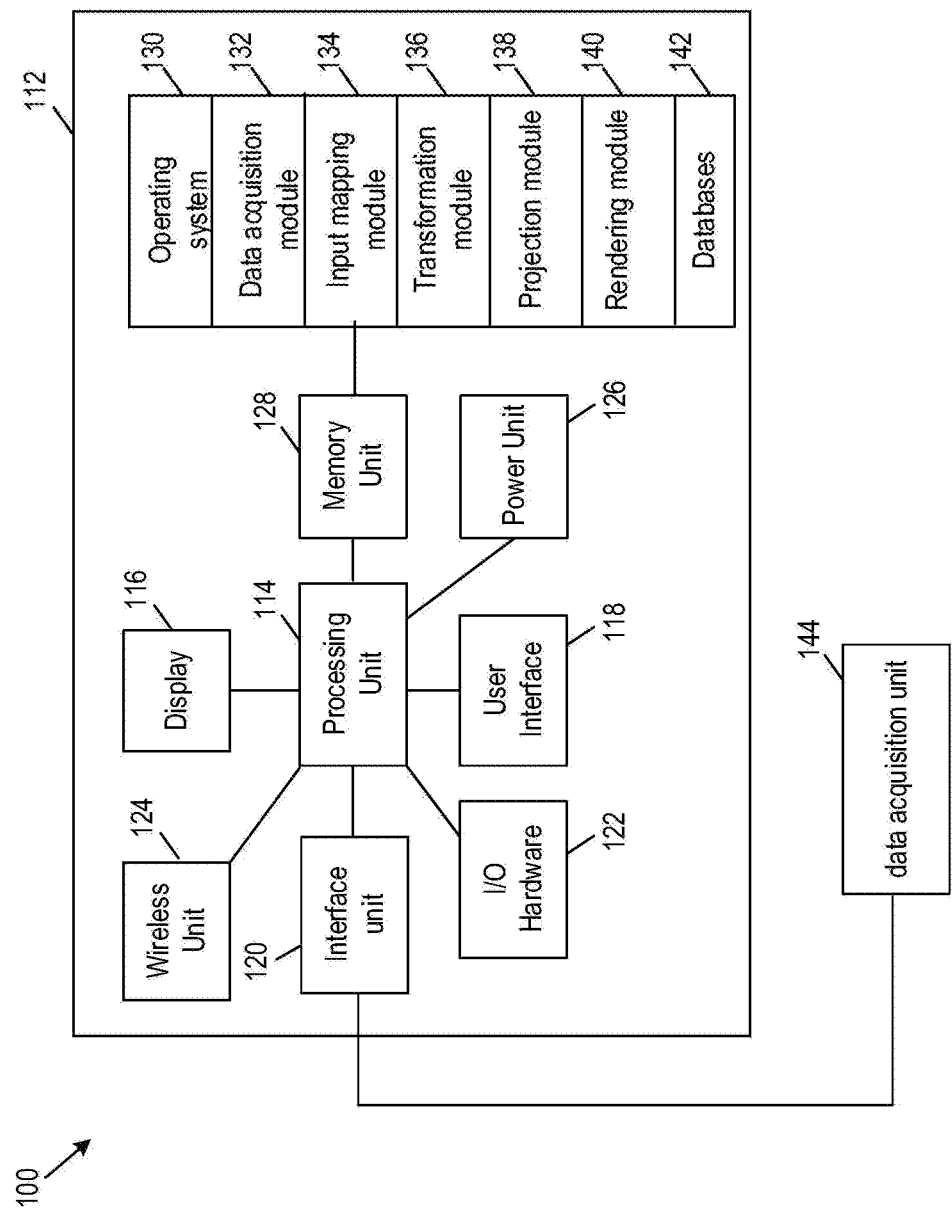
FIG. 1 is a block diagram of an example data processing system in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Systems, methods and computer program products described herein may facilitate data processing by transforming input data within an alternate dimensional space. In particular, image data generation and processing may be facilitated through transformations implemented within an alternate dimensional space. Data transformations that require complex computation within an initial dimensional space may be simplified within the alternate dimensional space. This may provide increased computational efficiency for data processing applications, in particular high volume and complex data processing applications, such as generating and rendering computer graphic data, augmented reality data, or virtual reality data. This may also provide increased computational efficiency for data processing applications such as parsing or analyzing large volumes of data.

Input data may be transformed using transformations that are defined within a six-dimensional coordinate system. A set of data transformations to be performed on one or more initial data objects can be defined in an initial coordinate system (e.g. a three dimensional or four dimensional space) having four dimensions or fewer. These transformations can be mapped to corresponding six-dimensional transformations in the six-dimensional coordinate system. The six-dimensional transformations can then be applied to the data objects. The transformed data can then be projected back to the initial coordinate system for output, storage, or further processing.

In some examples, the six-dimensional system may include three spatial dimensions and three temporal dimensions. This six-dimensional system (which may be referred to as $\mathbb{R}^{3,3}$) can be defined as a space of generalized transformations in spacetime. Relationships and mappings between the initial dimensional space of the six-dimensional systems can be used to generate the six-dimensional transformations.

In some examples, elements of the Clifford algebra or split conformal geometric algebras over $\mathbb{R}^{3,3}$ can be used to generate the six-dimensional transformations.

The projection from the six-dimensional space to the initial three dimensional or four dimensional space can be configured as a geometry preserving projection transformation. This geometry preserving projection transformation can map a 6-tuple embedded in the six-dimensional space to a corresponding 3-tuple or 4-tuple in the initial coordinate space. For example, the 6-tuple may be embedded in a six-dimensional $\mathbb{R}^{3,3}$ flat space. This 6-tuple may be mapped into a 4-tuple embedded in a 4 dimensional curved spacetime system (e.g. $\mathbb{R}^{3,1}$ three space dimensions and one temporal dimension that may be used to generate graphic motion).

In some cases, one or more dimensions of the initial dimensional space may be embedded into the six-dimensional space. For example, the dimensions of an initial three-dimensional space may be embedded into the framework of a six-dimensional coordinate system. The remaining dimensions may then be determined. Following calculations within the six-dimensional space, the embedded dimensions may be output directly while the remaining dimensions can be projected back to the initial dimensional space.

In some examples, the dimensions of the six-dimensional system may be embedded into, or combined with, additional dimensions to form a higher dimensional space. The six-dimensional space may be included within a higher dimensional space when performing certain types of computations. The higher dimensional space may be defined using tangent bundles to the six-dimensional space (e.g. the $\mathbb{R}^{3,3}$ space).

For example, the six-dimensional space may be embedded within a twelve dimensional space. The twelve dimensional space may be defined using two three-dimensional tangent bundles to the $\mathbb{R}^{3,3}$ space. The resulting twelve dimensional space may be identified as the $\mathbb{R}^{6,6}$ space. The dimensions of the said to be embedded within this $\mathbb{R}^{6,6}$ space.

In some examples, the $\mathbb{R}^{3,3}$ space may be defined using three spatial dimensions and three time dimensions. The higher dimensional space may be defined using dimensions that are tangential to the spatial and temporal dimensions. For example, three dimensions may be defined to model electrical forces. Alternatively or in addition, three dimensions may be defined to model magnetic forces. In some examples, the three spatial and three temporal dimensions of the six-dimensional space may be combined with the three magnetic dimensions and three electric dimensions to provide the twelve dimensional $\mathbb{R}^{6,6}$ space.

Data Processing System

The following is a general description of a data processing system and other features set out herein that may be used by itself or in combination with one or more embodiments disclosed herein, including a data processing method. The following description contains various features of a data processing system that may be used individually or in any combination or sub-combination.

Referring now to FIG. 1, there is provided is a block diagram of a data processing system 100 in accordance with an example embodiment. Data processing system 100 may be used to render computer generated graphics for video display, augmented reality, and/or virtual reality applications. Data processing system 100 may also be used to perform other data processing applications, such as data modelling and data analysis. Data processing system 100 may be used to facilitate parsing of large data volumes.

The data processing system 100 includes a data processing unit 112. The data processing unit 112 has at least one input for receiving data processing commands, at least one processing unit for mapping the data processing commands to an alternate dimensional space, transforming data using the mapped data processing commands within the alternate dimensional system, projecting the transformed data back to an initial dimensional system as output data, and rendering the output data if necessary; and at least one output for displaying rendered output data.

The system 100 further includes several power supplies (not all shown) connected to various components of the data processing system 100 for providing power thereto as is commonly known to those skilled in the art.

In general, a user may interact with the data processing unit 112 to provide initial input data from an internal or external data source, or directly from a data acquisition unit 144 coupled to the data processing unit 112. The user can provide commands to the data processing unit 112 to define operations to be performed on the initial input data to generate desired output data. After the input data and commands are received, the data processing unit 112 can determine transformations in the alternate dimensional system corresponding to the received commands, apply the transformations, and project the transformed data back to a desired dimensional system to be displayed, stored, or further processed or analyzed. The user may also use the data processing unit 112 to identify a sequence of data transformations within the initial input data (e.g. transformations already applied to the initial input data), and determine subsequent transformations to be applied to the initial input data.

In the example illustrated, the data processing unit 112 includes a processing unit 114, a display 116, a user interface 118, an interface unit 120, Input/Output (I/O) hardware 122, a wireless unit 124, a power unit 126, and a memory unit 128. In some embodiments, in which initial input data is to be obtained from analysis of external data or objects, the system 100 may further include a data acquisition unit 144, which is described in further detail below.

The processing unit 114 controls the operation of the data processing unit 112 and can be a suitable computer processor, such as a general purpose microprocessor. For example, the processing unit 114 may be a high performance processor. In other cases, the processing unit 114 may include other types of controllers, such as a field programmable gate array, application specific integrated circuit, microcontroller, or other suitable computer processor or digital signal processor that can provide sufficient processing power depending on the configuration and operational requirements of the data processing system 100.

Alternately or in addition, the processing unit 114 may include more than one processor with each processor being configured to perform different dedicated tasks, or to perform various processing tasks in parallel. Alternately or in addition, specialized hardware can be used to provide some of the functions provided by the processing unit 114. In some embodiments, the processing unit 114 may be provided by a plurality of distributed processors operable to communicate over a network, such as the Internet. Optionally, the data processing unit 112 may be coupled to a plurality of processing units 114, and may distribute operations between greater or fewer numbers of processing units 114 depending on the data processing requirements of a particular application.

The data processing system 100 may include a plurality of data processing units 112 that can be connected by a data communication network. The data processing units 112 may include a plurality of local data processing units, and may also include a network of remotely connected data processing units.

Processor 114 is coupled, via a computer data bus, to memory unit 128. Memory 128 may include both volatile memory (e.g. RAM) and non-volatile memory (e.g. ROM, one or more hard drives, one or more flash drives or some other suitable data storage elements such as disk drives, etc). Non-volatile memory stores computer programs consisting of computer-executable instructions, which may be loaded into volatile memory for execution by processor 114 as needed. It will be understood by those of skill in the art that references herein to data processing system 100 and/or data processing unit 112 as carrying out a function or acting in a particular way imply that processor 114 is executing instructions (e.g., a software program) stored in memory 128 and possibly transmitting or receiving inputs and outputs via one or more interface. Memory 128 may also store data input to, or output from, processor 114 in the course of executing the computer-executable instructions. Memory unit 128 may also store databases 142.

The memory unit 128 can be used to store the operating system 130. The operating system 130 provides various basic operational processes for the data processing unit 112. The data processing unit 112 may operate with various different types of operating system 130, such as Microsoft Windows™, GNU/Linux, or other suitable operating system.

The memory unit 128 can also store various user programs so that a user can interact with the data processing unit 112 to perform various functions such as, but not limited to, acquiring data, preprocessing data, analyzing the acquired or preprocessed data, processing the input data, rendering the processed data, as well as viewing, manipulating, communicating and storing data as the case may be.

As used herein, the terms "program", "software application" or "application" refers to computer-executable instructions, particularly computer-executable instructions stored in a non-transitory medium, such as a non-volatile memory, and executed by a computer processor such as processing unit 114. The computer processor, when executing the instructions, may receive inputs and transmit outputs to any of a variety of input or output devices to which it is coupled.

A software application may be associated with an application identifier that uniquely identifies that software application. In some cases, the application identifier may also identify the version and build of the software application. Within an organization, a software application may be recognized by a name by both the people who use it, and those that supply or maintain it.

The memory unit 128 on the data processing unit 112 may store a software application referred to herein as a data processing application. The data processing application can include software code for implementing an input mapping module 134, a transformation module 136, a projection module 138, and a rendering module 140. The memory unit 128 can also store software code for implementing an operating system 130, data acquisition module 132, and one or more databases 142 as well as various other programs.

Although shown separately from memory 128, it will be understood that the data processing applications (e.g. modules 134-140), and various other programs, may be stored in memory 128. In some cases, the data processing application may be a cloud-based application, rather than stored directly on data processing system 112. The data processing application may be configured to manage the performance of a plurality of processing operations for data processing system 112.

Examples of operations that can be performed by modules 132 to 140 will be described in greater detail with respect to FIG. 2. Some of the modules may be combined in some embodiments, for example the input mapping module 134, transformation module 136, and projection module 138 may be provided as a combined data processing module. Many components of the operator unit 112 can be implemented using one or more desktop computers, laptop computers, server computers, mobile devices, tablets, and the like.

In general, the data processing application can receive input commands from a user (e.g. via user interface 118). The data processing application can determine the transformations defined by the input commands and then map those transformations to the corresponding six-dimensional transformation. For example, six-dimensional transformations may be defined by the six-dimensional algebraic functions described herein below in relation to method 200. Alternately or in addition, six-dimensional transformations can include six-dimensional turtle transformations for generating turtle commands. Alternately or in addition, six-dimensional transformations can include six-dimensional fractal transformations that may be implemented using iterations in geometric algebra space coloring pixels according to how long the initial point takes to escape a ball of specified size in the hypercomplex six-dimensional space in the case of fractal image generation.

The display 116 can be any suitable display that provides visual information and data as needed by various programs depending on the configuration of the data processing unit 112. For instance, the display 116 can be a cathode ray tube, a flat-screen monitor and the like if the data processing unit 112 is implemented using a desktop computer. In other cases, the display 116 can be a display suitable for a laptop, tablet or a handheld device such as an LCD-based display and the like, or more generally any sort of external display that is connectable to a processing unit 114. In particular, display 116 may display a graphical user interface (GUI) of the operating system 130, and various other programs operated by processing unit 114 such as a data processing application.

The user interface 118 can include at least one of a mouse, a keyboard, a touch screen, a thumbwheel, a track-pad, a track-ball, a card-reader, voice recognition software and the like again depending on the particular implementation of the data processing unit 112. In some cases, some of these components can be integrated with one another.

The interface unit 120 can be any interface that allows the data processing unit 112 to communicate with other devices or systems. In some embodiments, the interface unit 120 may include at least one of a serial bus or a parallel bus, and a corresponding port such as a parallel port, a serial port or a USB port that provides USB connectivity. The busses may be external or internal. The busses may be at least one of a SCSI, USB, IEEE 1394 interface (FireWire), Parallel ATA, Serial ATA, PCIe, or InfiniBand. Other communication protocols may be used by the bus in other embodiments. The data processing unit 114 may use these busses to connect to the Internet, a Local Area Network (LAN), a Wide Area Network (WAN), a Metropolitan Area Network (MAN), a Wireless Local Area Network (WLAN), a Virtual Private Network (VPN), or a peer-to-peer network, either directly or through a modem, router, switch, hub or other routing or translation device.

The I/O hardware 122 is optional and can include, but is not limited to, one or more input devices such as a keyboard, mouse, trackpad, touchpad, microphone, camera and various other input devices. The I/O hardware 122 may also include one or more output devices in addition to display 116, such as a speaker, tactile feedback sensors, and a printer, for example.

The wireless unit 124 is optional and can be a radio that communicates utilizing CDMA, GSM, GPRS or Bluetooth protocol according to standards such as IEEE 802.11a, 802.11b, 802.11g, or 802.11n. The wireless unit 124 can be used by the data processing unit 112 to communicate with other devices or computers.

The power unit 126 can be any suitable power source that provides power to the data processing unit 112 such as, for example, a power adaptor or a rechargeable battery pack depending on the implementation of the data processing unit 112.

The data acquisition module 132 may be used to obtain initial input data, such as an input image object and/or video object from another processing system, a storage device, and/or data acquisition unit 144. The initial input data can be defined in an initial coordinate system, such as a three dimensional system (e.g. image data) or four dimensional system (e.g. video data). Optionally, the data acquisition module 132 may preprocesses the acquired data so that it may be analyzed and/or processed more accurately.

The input mapping module 134 can receive a data generation input and/or data processing input from a user of the system 112. For example, a user may provide a data generation input and/or data processing input via user interface 118. The user may interact with the user interface 118 of the processing unit 112 to input one or more data processing commands. For example, the display 116 may display of an image data object within a three-dimensional coordinate system. A user may interact with the displayed image object (e.g. using a mouse, keyboard and/or touchscreen) to input a user command corresponding to the image object. The user command may define one or more actions to be performed on the image data object, e.g. rotate, bend, twist, move, jump, etc. through interaction with the user interface.

The input mapping module 134 can determine a set of transformations corresponding to the data generation input and/or data processing input. The user may define a set of operations to be performed on an initial input image by specifying initial image transformations to be performed on the initial input image. For example, the user may define three-dimensional transformations to be performed on an initial three-dimensional input image.

For example, a user may interact with the user interface 118 to drag a displayed image object across a portion of the displayed coordinate space. The input mapping module 134 may determine that a translation transformation is to be performed on the initial input image.

As another example, a user may interact with the user interface 118 to provide an image generation command corresponding to a fractal image (e.g. fractal trees or fractal mountains) to be generated. The user may define the image generation command by specifying a fractal equation within the initial dimensional space.

As another example, the user may provide a set of turtle commands. The turtle commands may define the iterative steps for tree or mountain branching in each dimension of the initial dimensional space.

Optionally, a sequence of commands (e.g. desired operations) can be input by the user at once. Alternately, a user may enter each sequential set of transformations separately.

The input mapping module 134 can map each of the transformations in the set of transformations to an alternate dimensional space (e.g. a six-dimensional space). The mapped set of transformations may then be applied to the initial data.

For example, a corresponding set of six-dimensional transformations can be determined by the input mapping module 134. The input mapping module 134 may store a mapping between the initial dimensional space and the six-dimensional space. The input mapping module can also store definitions of six-dimensional transformations (e.g. calculations within the six-dimensional space that correspond to transformations within the initial dimensional space). The transformations in the initial space can then be converted to six-dimensional transformations using the stored mapping. Examples of processes for mapping data from an initial dimensional space to an alternate dimensional space, such as a six-dimensional space, are described in further detail herein below.

Transformation module 136 can apply the set of six-dimensional transformations to the initial input data. For example, the transformation module 136 may apply the set of six-dimensional transformations to an initial input image to generate an updated or subsequent image. Examples of various transformations that may be applied to input data are described in further detail herein below. Example mappings between initial transformations and transformations in an alternate dimensional space, such as a six-dimensional space, are also described further detail herein below.

The transformation module 136 may perform the calculations of all orders (scalar, vector, bivector, trivector, etc. . . . ) defined by the set of six-dimensional transformations substantially simultaneously. For example, calculations may be performed in parallel e.g. using multiple processing cores in some examples. This may allow the updated data object (e.g. the updated image object) to be generated more rapidly and more efficiently. This may reduce the time required for computation and in some cases reduce the number of computational resources required.

Optionally, the input mapping module 134 may also map the initial input data to the alternate dimensional space. For example, image data may be mapped from an initial data representation within a three-dimensional space to a six-dimensional data representation. The six-dimensional transformations may then be applied to the six-dimensional data representation. Alternately, the six-dimensional transformations may be applied directly to the initial input data.

In some examples, the initial input data may be embedded within the alternate dimensional space. That is, the dimensions of the initial input data within the initial dimensional space may be embedded as the corresponding dimensions in the alternate dimensional space. In such cases, only the remaining dimensions of the alternate dimensional space may be computed.

The projection module 138 can project the transformed data from the six-dimensional space to the initial dimensional space (e.g. a three dimensional or four dimensional space). The projected data may then be provided to rendering module 140, stored in memory unit 128, transmitted to an external device using wireless unit 124 and/or interface unit 120, and/or further analyzed by other programs stored in memory unit 128. The projected data may also be further modified through subsequent transformations.

In some examples, embedded dimensions may be output directly back to the initial dimensional space. The remaining additional dimensions of the alternate dimensional space may then be projected to the initial dimensional space.

The rendering module 140 may be configured to process and format the output data for display on display 116. For example, the rendering module 140 may include software configured to generate a two-dimensional or three-dimensional display image or sequence of two-dimensional/three-dimensional images from the projected data. Alternately or in addition, operation of the rendering module 140 may involve a graphics processing unit (GPU) that is configured to perform rendering calculations.

The operation performed by the modules 134 to 138 will be discussed in further detail herein below. It should be noted that the various modules 134 to 138 may be combined or further divided into other modules. For example the transformation module 136 and projection module 138 may be combined in some examples. The modules 134 to 138 are typically implemented using software, but there may be some instances in which at least some of these modules are implemented using FPGA or application specific circuitry.

The databases 142 can be used to store data for the system 110 such as system settings, parameter values, and calibration data. The databases 142 can also store other information required for the operation of the programs stored in memory unit 128, such as the operating system 130 and modules 132-140 such as dynamically linked libraries and the like. The databases 142 may also be used to store initial input data, updated data objects, and projected output data for example.

In some example embodiments, database 142 is a relational database. In other embodiments, database 142 may be a non-relational database, such as a key-value database, NoSQL database, or the like.

It should also be understood that some of the elements of the data processing unit 112, such as some or all of the memory 128 and/or processor 114 may be implemented using a combination of hardware and software resources, for instances using virtual machines and/or containers.

Data processing unit 112 may at times connect to external computers or servers via the Internet. For example, data processing unit 112 may connect to a software update server to obtain the latest version of a software application or firmware.

The data processing unit 112 comprises at least one interface that the processing unit 114 can communicate with in order to receive or send information. This interface can be the user interface 118, the interface unit 120 or the wireless unit 124. For instance, the initial input data, data generation/processing input as well as data processing parameters that may be used by the system 100 may be inputted by a user or otherwise selected through the user interface 118 or this information may be received through the interface unit 120 from a computing device. The processing unit 114 can communicate with either one of these interfaces as well as the display 116 or the I/O hardware 122 in order to use this input information to process the input data and present the projected output data. In addition, users of the data processing unit 12 may communicate information across a network connection to a remote system for storage and/or further processing, and/or remote presentation of the output data.

A user can also use the data processing unit 12 to provide information needed for system parameters that are needed for proper operation of the system 100 such as calibration information and other system operating parameters. The user may also use the data processing unit 112 to modify image generation characteristics for the system 100, such as the type of data being transformed and/or displayed. Input data received from users, transformed and/or projected data, as well as parameters used for operation of the system 100, may be stored in the memory unit 128.

The data acquisition unit 144 can include hardware circuitry and sensor (e.g. image and/or video capture sensors, such as digital image and/or digital video cameras) that is needed to capture and/or record initial input data, and/or monitor/analyze external objects in order to determine data usable to generate initial input data. Different variations are possible for the data acquisition unit 144.

The data processing system 100 is provided as an example and there may be other embodiments of the system 100 with different components or a different configuration of the components described herein.

Data Processing Method

The following is a general description of a data processing method and other features set out herein that may be used by itself or in combination with one or more embodiments disclosed herein, including a data processing system. The following description contains various features of a data processing method that may be used individually or in any combination or sub-combination.

A data processing method may receive and/or determine initial input data, such as an initial image object or video object. A data processing input, such as an image or video generation input, or an image modification input, can be received. A set of transformations to be applied to the initial input data can be determined from the data processing input. The set of transformations may be defined in an initial dimensional space (e.g. a two-dimensional (2D), three-dimensional (3D), or four-dimensional (4D) initial space). The set of transformations can be mapped to an alternate six-dimensional (6D) space to define a set of six-dimensional transformations. The six-dimensional transformations can then be applied to the initial input data in order to generate transformed six-dimensional data. The transformed six-dimensional data can then be projected back to the initial dimensional space, for further processing, display, and/or rendering for display. In some cases, the initial input data may also be mapped to and/or embedded within the same alternate six-dimensional space.

Performing the transformations within the six-dimensional space may simplify the computational process, particularly for complex data processing operations. This may enable faster and more efficient data processing. For example, complex data transformations may be calculated using geometric algebra in place of some or all of the matrix computations that may be required within an initial dimensional space.

Figure 2:
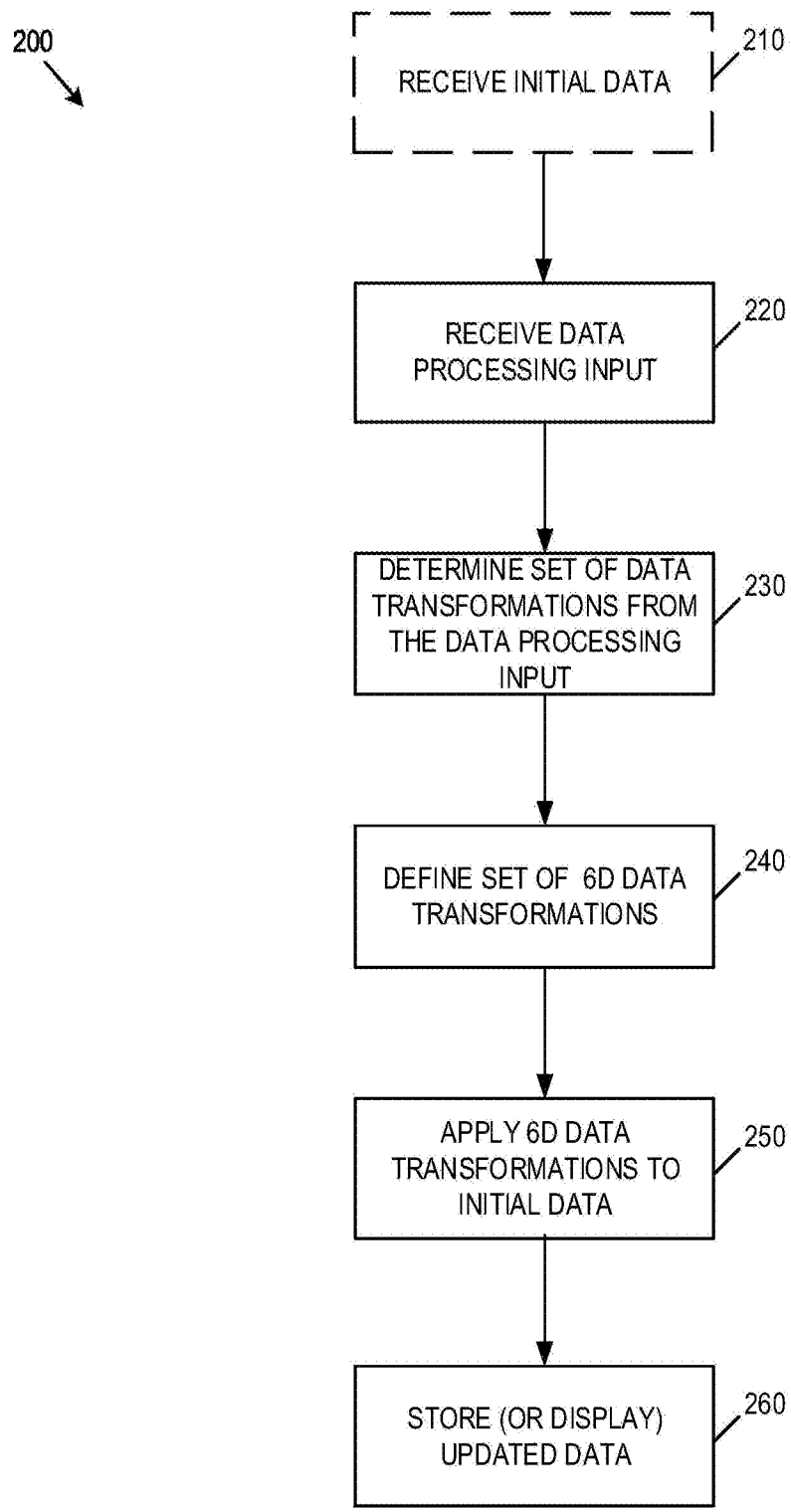
FIG. 2 is a flowchart illustrating an example data processing method in accordance with an embodiment.

Referring now to FIG. 2, shown therein is an example data processing method 200. Data processing method 200 is an example of a data processing method that may be implemented by a system such as system 100. The operations illustrated by data processing method 200 may be performed by programs such modules 132-140, some or all of which may be integrated into a data processing application or computer graphic generation application.

In some examples, the data processing method 200 may perform operations within an alternate six-dimensional space. An example definition of a six-dimensional space that may be used with data processing method 200 will now be described to provide a basis for the description of method 200 that follow.

The example six-dimensional space can be defined in relation to an initial dimensional space. For simplicity, in the discussion that follows, the six-dimensional space will be described in relation to an initial three dimensional space. While initial input data to the method 200 may be received in other dimensional spaces (e.g. two dimensions or four dimensions), it should be understand that the following description can be modified to account for these alternate initial dimensional spaces (e.g. by providing additional null dimensions for a one-dimensional or two-dimensional initial input, or representing a four dimensional input as a series or sequence of three dimensional inputs).

An initial three-dimensional (3D) space or coordinate system can be defined using three dimensions ($e_1$, $e_2$, $e_3$). For example, the initial three-dimensional space may be a Cartesian coordinate system. This initial three-dimensional space can be mapped to an alternate six-dimensional space to enable six-dimensional transformations to be applied to input data received within the initial dimensional space.

The initial three-dimensional space with three dimensions can be mapped or converted to a four-dimensional (4D) space with four dimensions ($e_0$, $e_1$, $e_2$, $e_3$). The four-dimensional space includes an extra dimension (represented by $e_0$) as compared to the initial three-dimensional space.

In some cases, the three dimensions from the initial dimensional space may be embedded directly into the four-dimensional space (e.g. $e_1$, $e_2$, $e_3$ may be embedded directly from the three-dimensional space to the four-dimensional space). The extra fourth dimension may then be calculated.

The four-dimensional system may be referred to herein as $V^4$. This four-dimensional system $V^4$ may be defined as a homogeneous coordinate system. The unit vector of the fourth dimension, $e_0$, can be defined as the fourth unit coordinate vector in a Grassmann algebra. This extra dimension can provide an extra (positive) scaling factor for embedding a geometry preserving three-dimensional transformation into the four-dimensional space.

The four-dimensional coordinate system can, in turn, be mapped or converted to a six-dimensional (6D) coordinate system. A mapping can be defined between the dimensions of the four-dimensional coordinate system and the dimensions of the six-dimensional coordinate system. For example, the six null vectors of the six-dimensional coordinate system can be defined based on bivectors of the four dimensions of the four-dimensional coordinate system. The null vectors of the six-dimensional coordinate system may be determined by calculating bivectors corresponding to the exterior/edge products of the four-dimensions of the four-dimensional space.

A three-dimensional Euclidean vector (i.e. a vector within the initial three-dimensional space) can be represented as an arrow $\vec{p}$. When the fourth coordinate in the four-dimensional space is non-zero, the corresponding (Euclidean) point in the three-dimensional space may be referred to as a weighted point. A weighted point at location $\vec{p}$ can be denoted $\alpha(e_0 + \vec{p})$.

A line between two weighted points can be defined as the bivector L:

$$L = p \wedge q = \alpha\beta(e_0 \wedge (\vec{q}-\vec{p}) + \vec{p} \wedge \vec{q}) = \alpha\beta(e_0 \wedge \vec{u} + \vec{p} \wedge \vec{u}),$$

where $\vec{u} \equiv \vec{q} - \vec{p}$. Any bivector $A \in \wedge^2 V^4$ is a line in the three-dimensional space (finite or at infinity) if and only if $A \wedge A = 0$. This can also be represented by the three-dimensional relation $\vec{u} \times (\vec{p} \times \vec{u}) = 0$.

The null vectors $v_{01}, v_{02}, v_{03}, v_{23}, v_{31}, v_{12}$ may define the basis of the six-dimensional space. The null vectors $v_{01}, v_{02}, v_{03}, v_{23}, v_{31}, v_{12}$ can be determined by calculating bivectors corresponding to the exterior/edge products of the 4 dimensions ($e_0, e_1, e_2, e_3$) according to:

$$v_{01} = e_0 \wedge \hat{e}_1$$

$$v_{02} = e_0 \wedge \hat{e}_2$$

$$v_{03} = e_0 \wedge \hat{e}_3$$

$$v_{23} = \hat{e}_2 \wedge \hat{e}_3$$

$$v_{31} = \hat{e}_3 \wedge \hat{e}_1$$

$$v_{12} = \hat{e}_1 \wedge \hat{e}_2$$

The six-dimensional space may be configured with three spatial dimensions and three temporal dimensions. The coefficients of the lines L in a basis with $$v_{ij} \in \{e_0 \wedge \hat{e}_1, e_0 \wedge \hat{e}_2, e_0 \wedge \hat{e}_3, \hat{e}_2 \wedge \hat{e}_3, \hat{e}_3 \wedge \hat{e}_1, \hat{e}_1 \wedge \hat{e}_2\},$$

where $i, j = 0, 1, 2, 3$ can define a 2-blade basis of the split signature six-dimensional space $\mathbb{R}^{3,3}$. These coefficients can define the six null vectors (light-cone vectors) of $\mathbb{R}^{3,3}$.

The embedding or mapping from the four-dimensional space to the six-dimensional space may be denoted $\iota: \wedge^2 V^4 \to \mathbb{R}^{3,3}$. This mapping defines a relationship between an oriented line/2-blade L and a vector l with components $l_{ij}$. The mapping may be inverted.

In some cases, the four-dimensional system may be converted to an initial six-dimensional coordinate system and then converted to a further six-dimensional coordinate system. The null vectors $v_{01}, v_{02}, v_{03}, v_{23}, v_{31}, v_{12}$ may define the basis of the initial six-dimensional space.

In some cases, the initial six-dimensional coordinate system may be converted to a six-dimensional metric space (e.g. $\mathbb{R}^{3,3}$ can be converted into a metric space). Converting the initial six-dimensional space to a six-dimensional metric space may ensure that the dimensions of the six-dimensional space reflect dimensions of natural systems. This may allow a six-dimensional space with three time dimensions and three spatial dimensions to provide a metric space similar to a Minkowski space.

For example, an inner product can be defined as:

$$\cdot: \mathbb{R}^{3,3} \times \mathbb{R}^{3,3} \to \mathbb{R}^{3,3}: a \cdot b = (\iota^{-1}(a) \wedge \iota^{-1}(b))_0,$$

where $()_0$ represents taking the scalar part (mod out the pseudoscalar $I_4$).

The inner product of two finite unit weight lines in the initial six-dimensional space can be defined as:

$$\iota(L) \cdot \iota(M) = [(e_0 + \vec{p}) \wedge \vec{u} \wedge (e_0 + \vec{q}) \wedge \vec{v}] = [e_0 \wedge \vec{u} \wedge (\vec{q} - \vec{p}) \wedge \vec{v}] = \det([\vec{u}(\vec{q} - \vec{p}) \vec{v}]) = \delta \sin \phi,$$

where $\delta$ represents the perpendicular signed distance between the lines, and $\phi$ represents the signed angle between the two unit vectors of the lines. Parallel or intersecting lines can be shown to have a vanishing inner product.

The null vectors $v_{ij}$ can define a set of lines in $\mathbb{R}^{3,3}$. The inner product defined above is non-degenerate and can provide a metric space structure to $\mathbb{R}^{3,3}$, with unit vector basis:

$$\{\epsilon_1^+, \epsilon_2^+, \epsilon_3^+, \epsilon_1^-, \epsilon_2^-, \epsilon_3^-\} = \frac{1}{\sqrt{2}}\{v_{01} + v_{23}, v_{12} + v_{30}, v_{03} + v_{12}, v_{01} - v_{23}, v_{02} - v_{31}, v_{03} - v_{12}\}$$

The six-dimensional metric space may thus be defined based by unit vectors $\epsilon_1^+, \epsilon_2^+, \epsilon_3^+, \epsilon_1^-, \epsilon_2^-, \epsilon_3^-$. As illustrated above, the unit vectors ($\epsilon_1^+, \epsilon_2^+, \epsilon_3^+, \epsilon_1^-, \epsilon_2^-, \epsilon_3^-$) for the six-dimensional metric space can be determined from the null vectors ($v_{01}, v_{02}, v_{03}, v_{23}, v_{31}, v_{12}$) of the initial six-dimensional system as:

$$\epsilon_1^+ = (v_{01} + v_{23})$$

$$\epsilon_2^+ = (v_{12} + v_{30})$$

$$\epsilon_3^+ = (v_{03} + v_{12})$$

$$\epsilon_1^- = (v_{01} - v_{23})$$

$$\epsilon_2^- = (v_{02} - v_{31})$$

$$\epsilon_3^- = (v_{03} - v_{12})$$

The unit vector bases can be seen to satisfy $\epsilon_i^{+2} = 1 = -\epsilon_i^{-2}$. Additionally, all other inner products of unit vectors can be shown to be zero $\epsilon_i^{\pm} \cdot \epsilon_j^{\pm} = 0$ for $i \neq j$. This provides an extra split-signature metric of the six-dimensional metric coordinate system $\mathbb{R}^{3,3}$.

This definition can be generalized to all Lie algebras from the Killing form. It can be shown that the metric of the coordinate system $\mathbb{R}^{3,3}$ is proportional to the Killing form (e.g. ⅛ of the Killing form).

The above description provides a mapping of 'weighted' Grassmann vectors $\{e_i\}$ directly into a conformal geometric algebra defined with six dimensions. The six-dimensional space described herein above can preserve local orientations and angles of data from the initial dimensional space.

Within this conformal geometric algebra, the vectors, also denoted $\{e_i\}$, can be wedged to form bivectors, trivectors, and so on, up to n-vectors (also called blades), where n is the dimension of the space. Linear combinations of such vectors may be referred to as multivectors. These multivectors have also a product called the geometric product:

$$a * b = a \wedge b + a \cdot b$$

where · is the inner product or contraction similar to usual Grassmann algebra. The geometric algebras can be defined by generalized Clifford algebras with any desired metric signature. The six-dimensional space can be generated using Python from the Clifford package, for example using pseudo-code such as shown in Table 1 below:

TABLE 1

Example Pseudocode for Initializing
Six-dimensional Basis Vectors import clifford
from clifford import Cl, conformalize
layout, blades =clifford.Cl(3,3)
locals( ).update(blades)
print(blades)
print(e1|e1,e5|e5)

The pseudocode illustrated in Table 1 is an example of pseudocode that may be used to initialize the basis multivectors in the example six-dimensional space described above for transformations defined within an initial three-dimensional space. The pseudocode illustrated in Table 1 can be used to initialize the basis vectors of a split-signature six-dimensional Clifford algebra, which may be represented as Cl(3,3). This Clifford algebra can be used to define the six-dimensional transformations used to process data.

The example pseudocode in Table 1 is defined to generate the basis vectors $\{e_i\}_0^5$, print the basis blades, and produce the algebra and metric structure for the conformal geometric algebra $Cl_{3,3}$ that is defined within a six-dimensional space having three spatial dimensions and three time dimensions $\mathbb{R}^{3,3}$.

Although described herein above as a six-dimensional space, in some cases the six-dimensional space may be further embedded within a higher dimensional space. For example, the six-dimensional space $\mathbb{R}^{3,3}$ may be embedded within a twelve dimensional space having six-additional dimensions. The twelve dimensional space may be defined using two three-dimensional tangent bundles to the $\mathbb{R}^{3,3}$ space. The resulting twelve dimensional space may be identified as the $\mathbb{R}^{6,6}$ space. The dimensions of the $\mathbb{R}^{3,3}$ space may be said to be embedded within this $\mathbb{R}^{6,6}$ space.

As explained above, the $\mathbb{R}^{3,3}$ space may be defined with three spatial dimensions and three time dimensions. The higher dimensional space may be defined using dimensions that are tangential to the spatial and temporal dimensions. For example, three dimensions may be defined to model electrical forces. Alternatively or in addition, three dimensions may be defined to model magnetic forces. In some examples, the three spatial and three temporal dimensions of the six-dimensional space may be combined with the three magnetic dimensions and three electric dimensions to provide the twelve dimensional $\mathbb{R}^{6,6}$ space.

Transformations can be applied to the input data following conversion to the six-dimensional space. The six-dimensional transformations can be defined to project the resulting transformed data back into an output space, such as the initial dimensional space. The output space may be defined based on the desired output, such as, for example a three-dimensional output for a three-dimensional model object, virtual reality object, or two-dimensional video object, a two dimensional output for an image object.

In some cases, the various types of projective transformations, or collineations, can be implemented as processing modules within the data processing system (e.g. an image generation system). For example, transformation module 136 may be separated into a plurality of different transformation modules corresponding to respective data transformations.

A projective transformation, or collineation that generates an output object in a three-dimensional coordinate space, can be defined as a GL(4) action on $V^4$, with the homogeneous degree of freedom restricted by setting the matrix determinants to one. A set of non-singular projective transformations can then be defined that are a subgroup of $SL_4(\mathbb{R})$, with 15 degrees of freedom.

The six-dimensional metric coordinate system $\mathbb{R}^{3,3}$ includes $\binom{6}{2}=15$ independent bivectors. Table 2 below illustrates the correspondence between the null vectors of the six-dimensional space and the 15 independent bivectors of the six-dimensional metric coordinate system $\mathbb{R}^{3,3}$:

TABLE 2

Correspondence between null vectors and bivectors

| | $v_{01}$ | $v_{02}$ | $v_{03}$ | $v_{23}$ | $v_{31}$ | $v_{12}$ |
|---|---|---|---|---|---|---|
| $v_{01}$ | 0 | $-f_3$ | $f_2$ | $-\pi_1$ | $-\sigma_{21}$ | $-\sigma_{31}$ |
| $v_{02}$ | $-f_3$ | 0 | $-f_1$ | $-\sigma_{12}$ | $-\pi_2$ | $-\sigma_{32}$ |

TABLE 2-continued

Correspondence between null vectors and bivectors

| | $v_{01}$ | $v_{02}$ | $v_{03}$ | $v_{23}$ | $v_{31}$ | $v_{12}$ |
|---|---|---|---|---|---|---|
| $v_{03}$ | $-f_2$ | $f_1$ | 0 | $-\sigma_{13}$ | $-\sigma_{23}$ | $-\pi_3$ |
| $v_{23}$ | $\pi_1$ | $\sigma_{12}$ | $\sigma_{13}$ | 0 | $\tau_3$ | $-\tau_2$ |
| $v_{31}$ | $\sigma_{21}$ | $\pi_2$ | $\sigma_{23}$ | $-\tau_3$ | 0 | $\tau_1$ |
| $v_{12}$ | $\sigma_{31}$ | $\sigma_{32}$ | $\pi_3$ | $\tau_2$ | $-\tau_1$ | 0 |

Exponentials of the bivectors of the six-dimensional metric space shown in Table 2 can be used to define six-dimensional transformation rotors. The six-dimensional transformation rotors can include versors R such that $R\tilde{R}=1$. These six-dimensional transformation rotors can be defined to have a 1:1 correspondence with the projective collineations of $\mathbb{R}^3$. The projective transformations of $\mathbb{R}^3$ can thus be defined as orthogonal transformations of the $\mathbb{R}^{3,3}$ coordinate system. This relationship can be represented by the isomorphism $SL_4(\mathbb{R}) \approx \wedge^2 V^4$.

The set of projective transformations that can be performed in the six-dimensional coordinate system can include a plurality of different types of transformations. In some cases, the set of projective transformations can include one or more of at least one translation transformation, at least one rotational transformation, at least one perspective transformation, at least one scaling transformation, and/or at least one Lorentz transformation. For example, the set of projective transformations may include three translations, three rotations, three perspective transformations, three axis scaling/dilation transformations, and six shears/'squeezings'/ Lorentz transformations. In some cases, each type of transformation may include a separate processing module (e.g. transformation module 136 may be separated into a plurality of separate transformation modules).

These transformations can be defined in the six-dimensional space using the bivectors shown in Table 2 above. User inputs defined within an initial dimensional space can be used to determine the bivector coefficients $f_i, \pi_i, \sigma_i, \tau_i$. The user inputs may be user transformation commands that define a set of transformations within the initial dimensional space.

The determined bivector coefficients along with the bivector to null vector mapping defined in Table 2 can be used to determine the rotor(s)/transformation(s) within the six-dimensional space that correspond to the set of transformations defined by the user commands. For example, each six-dimensional transformation may be determined as the exponential of a signed linear combination of the bivectors shown in Table 2.

At 210, an initial data set can be received. The initial data set can include at least one input data object that is defined within a first or initial dimensional space.

The first dimensional space may be defined with at most four dimensions.

The initial data set can include one or more data objects that are to be modified by the data processing unit 112. In some cases, the initial data set may be defined directly by a user, e.g. by identifying one or more data files or data objects as the initial data set. Alternately or in addition, the data processing unit 112 may determine the initial data set from data processing commands received from the user. For example, the user may specify a new data object that is to be generated by the data processing unit (e.g. by providing a series of turtle commands).

In some cases, the at least one input data object may be defined in an initial one-dimensional space. For example, the at least one input data object may include numerical data or DNA data.

In some cases, the at least one input data object may be defined in an initial two-dimensional space. For example, the at least one input data object may include a two-dimensional image object.

In some cases, the at least one input data object may be defined in an initial three-dimensional space. For example, the at least one input data object may include a three-dimensional image object such as an interactive model or a two-dimensional video object.

In some cases, the at least one input data object may be defined in an initial four-dimensional space. For example, the at least one input data object may include a three-dimensional video object. Alternately, a three-dimensional video object may be defined as a sequence of objects within an initial three-dimensional space (e.g. as a sequence of three-dimensional image objects).

At 220, a data processing input can be received. The data processing input can be received for the initial data set received at 210. The data processing input can define at least one operation to be performed on the at least one input data object.

The data processing input may be defined by a user through the processing unit 112. A user may interact with the user interface 118 of the processing unit 112 to input one or more data processing commands. The data processing commands can be defined within the initial dimensional space of the data object to be processed.

For example, where the initial data object is a three-dimensional data object, the data processing commands can be defined within the corresponding three-dimensional coordinate system. The data processing unit 112 may then interpret the data processing commands to determine the at least one operation to be performed.

In some cases, the data processing input may be an image generation input. The image generation input may define operations to be performed in order to generate a digital image. An initial image may be determined from the image generation input. The initial image may include least one initial image object defined in a three-dimensional coordinate system. The initial data set may then be determined based on the image generation input received at 220.

In some cases, the data processing input can include a data identification input. The data identification input may be used to identify the at least one input data object upon which the at least one operation is to be performed.

In some cases, the data identification input may also be used to determine the at least one operation. For example, the at least one input data object may include a sequence or other pattern of input data objects. The data processing unit 112 may then analyze the data identification input in order to determine the at least one operation to be performed. For example, the data processing unit 112 may determine the at least one operation to be performed based on an identified input data object pattern.

In some examples, the data processing input may be an image generation input that include a video object. The video object may include a sequence of image objects including the at least one initial image object. The data processing unit 112 may determine an image generation sequence based on the sequence of image objects in the video object. The data processing unit 112 can then determine the subsequent transformation to be applied based on the identified image generation sequence.

In some cases, the initial data set and data processing input may be combined. Accordingly, steps 210 and 220 may occur simultaneously or as a single combined step. For example, the data processing input may include both a data object and a data processing command defined by a user.

In some cases, the initial data set may be generated in response to data generation data included in the data processing input. As an example, the data processing input may be an image generation input specifying a new image data object to be generated. The initial data set may then include the characteristics of the new image data object that is to be generated.

In some cases, step 210 may be omitted. For instance, the data processing input may provide the processing unit 112 with commands that specify how the initial data set is to be generated. As an example, the commands may specify an initial image to be generated by the processing unit 112.

At 230, a set of data transformations can be determined from the data processing input. The data processing input can specify that the set of data transformations are to be performed on the at least one data object.

The set of data transformations can include at least one initial data transformation defined in a first dimensional space. The first dimensional space may correspond to a dimensional space of the initial object. In some cases, the first dimensional space may also correspond to an output dimensional space in which a final output object is to be generated.

In some cases, the data processing input may define the set of data transformations directly. For example, the data processing input may include data transformation commands specified by a user. The commands may be specified through interaction with user interface 118 (e.g. using an input device such as a mouse, keyboard, or touchscreen).

For example, a user may interact with user interface 118 to input commands such as rotate an image object a number of degrees, move the image object forward/backward a certain distance, twist the image object, boost motion of the image object to a different relativistic speed, etc. The user may also input commands that are more indirectly related to the transformations to be performed. For instance, where the data processing input specifies that a fractal is to be generated, the user may adjust the shape and/or number of arms and/or the type of fractal. In some cases, the user may also make further modifications, such as modifying the color of an image data object.

As an example, the processing method may be implemented using the Python programming language (see e.g. FIGS. 5, 6, 8, 15A-15D and 17A-17E). For instance, FIGS. 17A-17E illustrate a screenshot of example pseudocode defining data processing inputs in Python for a virtual reality application in accordance with an embodiment.

Alternately or in addition, the processing method may be implemented using a Visual Python program. The user may interact with the interface 118 through keyboard instructions and a mouse to zoom in and rotate/change perspectives and camera angle.

In some cases, the data processing commands may specify a sequence of transformations to be performed. For example, the user may define a fractal generation pattern (e.g. a turtle pattern) to be performed by the data processing unit 112. The data processing unit 112 may then identify an image generation sequence based on the defined generation pattern.

Alternately, the data processing input may not specify the set of data transformations directly. For example, a user may provide commands instructing the data processing unit to analyze the at least one data object in order to determine the set of data transformations. The data processing unit 112 may then determine the set of image transformations to be performed based on the analysis of the at least one data object.

In some cases, the data processing commands may specify that the data processing unit 112 analyze the at least one initial image object to identify an image generation sequence for the at least one initial image object. The data processing unit 112 may then determine a predicted sequence of subsequent modifications to the initial image object based on the identified image generation sequence. The predicted sequence of subsequent modifications may correspond to a continuation of an image generation pattern defined by the image generation sequence. The data processing unit 112 can then define the set of image transformations using the predicted sequence of subsequent modifications.

For example, a user may input a sequence of image objects that illustrate the generation of a Turtle object. The data processing unit 112 may analyze the sequence of Turtle image objects to determine a Turtle pattern used to define the Turtle object. The data processing unit 112 may then determine that the sequence of subsequent modifications involves continuing the generation of the Turtle object by adding to the object in accordance with the Turtle pattern.

As another example, a user may input a sequence of image objects or a video objects that illustrates the growth of a plant. The data processing unit 112 may analyze the sequence of plant growth image objects to determine a growth pattern for the plant growth image objects. The data processing unit 112 may then predict the sequence of subsequent modifications based on the growth pattern for the plant growth image objects and the current state of the plant growth image object that is to be modified. This may allow the data processing unit 112 to generate a predicted model of plant growth.

In some cases, the data processing unit 112 may incorporate additional factors into the determination of subsequent modifications to the initial image object. For example, dynamic forces such as physical restrictions and laws of nature (e.g. gravity, EM forces etc.) may be modelled by the data processing unit 112. The data processing unit 112 may then determine and/or modify the sequence of subsequent modifications using these physics models. This may provide accurate growth models that account for various physical factors such as gravity and the weight of the objects shown in the image object. For example, additional physics may be modelled using a higher dimensional space. For example, a twelve dimensional space may incorporate three dimensions used to model electrical forces and three dimensions used to model magnetic forces in addition to the three spatial dimensions and three temporal dimensions of a split-signature six-dimensional space.

At 240, the data processing unit 112 can define a six-dimensional set of data transformations. The six-dimensional set of data transformations can be defined to correspond to the set of data transformations determined at 230. Each initial data transformation in the set of data transformations can be mapped to a corresponding six-dimensional transformation. Each six-dimensional transformation can be defined in a six-dimensional space.

For example, each six-dimensional transformation can be defined within the example six-dimensional metric space $\mathbb{R}^{3,3}$ described herein above. The six-dimensional transformations may be defined using bivectors of the six-dimensional metric space $\mathbb{R}^{3,3}$. The bivector coefficients may be determined based on the initial transformations determined at 230.

The data processing unit 112 can store a set of mappings between the initial coordinate space of the initial transformations and the six-dimensional space. The data processing unit 112 may then map inputs/commands received from a user that are defined within the initial coordinate space to the six-dimensional space. For example, the bivector coefficients determined from the initial transformations can be applied to the stored mappings to determine the set of six-dimensional transformations.

The user can interact with interface unit 118 to provide image processing commands in a manner similar to interacting with an image generation program operating within a three-dimensional space. The user need not have any knowledge of the six-dimensional space. Rather, the data processing unit 112 can be configured to map the input commands directly to the six-dimensional space (i.e. map the transformations defined by the input commands to the equivalent transformation in the six-dimensional space).

In some cases, the mapping between the initial dimensional space and the six-dimensional space may be defined based on a plurality of spatial mappings. Data from the initial dimensional space may be mapped to one or more intermediate dimensional spaces prior to being mapped to the six-dimensional space. Alternately or in addition, one or more dimensions of the initial dimensional space may be embedded directly within the six-dimensional space.

For example, the first dimensional space may have fewer than four dimensions. The process of mapping each initial data transformation in the set of data transformations to the corresponding six-dimensional transformation may involve mapping each initial data transformation into a corresponding four-dimensional transformation. Each four-dimensional transformation may be defined in a homogenous four-dimensional space, such as the example $V^4$ space described herein. Each four-dimensional transformation may then be mapped to the corresponding six-dimensional transformation.

In some cases, the mapping from the four-dimensional space to the six-dimensional space can be defined using the unit coordinate vectors of the four-dimensional coordinate system. For example, the dimensions of the six-dimensional space may be determined from the exterior products of the unit coordinate vectors of the four-dimensional coordinate system. The resulting bivectors calculated from the exterior products can be used to define the six-dimensional space.

In some cases, the six-dimensional space may be defined as a six-dimensional metric space, such as the metric space $\mathbb{R}^{3,3}$ described herein above. The process of mapping each initial data transformation in the set of data transformations to the corresponding six-dimensional transformation may involve mapping each initial data transformation into an initial six-dimensional transformation that is defined in an initial six-dimensional coordinate system. Each initial six-dimensional transformation may then be mapped to the corresponding six-dimensional transformation by converting the initial six-dimensional coordinate system to the six-dimensional metric space.

It should be understood that mappings from an initial dimensional space to a final alternate dimensional space may be performed as a single, combined mapping calculation. That is, the mapping from the initial dimensional space to one or more intermediate dimensional spaces and to the final alternate dimensional space may be performed as a single combined mapping that integrates (or is defined based on) the sequence of dimensional mappings.

The initial six-dimensional coordinate system may be converted to a metric space using the null vectors of the initial six-dimensional coordinate system. For example, the dimensions of the six-dimensional metric space may be defined using unit vectors that are calculated from the null vectors of the initial six-dimensional coordinate system.

As noted above, in some cases the first dimensional space includes fewer than four dimensions. In such cases, mapping each initial data transformation into the initial six-dimensional transformation may include mapping each initial data transformation into a corresponding four-dimensional transformation that is defined in the homogenous four-dimensional space. Each four-dimensional transformation may then be mapped to the initial six-dimensional transformation.

The dimensions of the initial six-dimensional space may be defined based on unit coordinate vectors from the four-dimensional space. For example, null vectors for the initial six-dimensional space can be determined using bivectors calculated as the exterior products of the unit coordinate vectors of the four-dimensional space. These null vectors can be used to define the dimensions of the initial six-dimensional transformation.

By defining mappings from the initial dimensional space to the six-dimensional space, a user can provide commands to the data processing unit 112 that are defined according to that initial dimensional space. The user's inputs or commands, and the set of operations determined therefrom, can be mapped to one or more of the six-dimensional transformations defined in the six-dimensional space. The six-dimensional space can include six coordinates $x_1, x_2, x_3, t_1, t_2, t_3$ within the $\mathbb{R}^{3,3}$ coordinate system. The six coordinates can include three time coordinates ($t_1, t_2, t_3$) and three space coordinate ($x_1, x_2, x_3$).

A user may interact with an image data object displayed in a three-dimensional coordinate system to input a user command. The user command may define an action to be performed on the image data object, e.g. rotate, bend, twist, move, jump, etc. Each of these actions define motion within an initial three-dimensional coordinate system that correspond to a transformation defined in $\mathbb{R}^{3,3}$.

Within the six-dimensional space, the calculations associated with the six-dimensional transformations can be performed in all orders (scalar, vector, bivector, trivector, etc. . . . ) in parallel, and in some cases simultaneously using six-dimensional geometric algebra. This may allow transformations to be computed more rapidly, e.g. through the use of parallel processing techniques.

Examples of mapping between initial transformations defined in an initial dimensional space (using the example of a three-dimensional space) and six-dimensional transformations are described below in respect of various example types of transformations (translations, rotations, perspective transformations, shearing transformations, Lorentz transformations, pinch transformations, and dilation transformations). The initial transformations can be defined within the initial dimensional space of the object or data that is to be transformed. This initial transformation can be mapped to a six-dimensional transformation defined using the dimensions of the six-dimensional space. The six-dimensional transformation can then be applied to the initial data object and projected back to the initial dimensional space.

User inputs or commands that are defined within the initial dimensional space may define bivector coefficients $f_i$, $\pi_i$, $\sigma_i$, $\tau_i$. The data processing unit 112 can use the bivector coefficients along with the bivector correspondence defined in Table 2, and the transformation mappings described herein below, to determine input bivectors that can, in turn, be used to determine the corresponding rotor/transformation within the six-dimensional space.

Translation Transformations

An example translation transformation is described in relation to a translation along a first axis of an initial three-dimensional space, in this example using the $e_1$ unit vector of the three-dimensional space. Similar translation transformations may be applied with the other axes of the initial three-dimensional space, and/or with other initial dimensional spaces.

An initial transformation along the first axis of the initial three-dimensional space can be defined as $\vec{t} = \tau\hat{e}_1$. This initial transformation can, in turn, be represented in a four-dimensional space $V^4$ as $e_0 \to e_0 + \tau\hat{e}_1$.

A user may interact with the user interface 118 to specify that a data object be translated along the axis $\hat{e}_1$ by a distance $\tau$. For example, a user may drag the representation of the data object along the axis $\hat{e}_1$ using a mouse or touchscreen interface.

The six-dimensional transformation or rotor that corresponds to the three-dimensional translation along $\vec{t} = \tau\hat{e}_1$, can be defined to satisfy:

$$V_1 v_{02} \tilde{V}_1 = v_{02} + \tau v_{12} = (e_0 + \tau\hat{e}_1) \wedge \hat{e}_2,$$

$$V_1 v_{03} \tilde{V}_1 = v_{03} + \tau v_{31} = (e_0 + \tau\hat{e}_1) \wedge \hat{e}_3,$$

with the other null vectors left invariant.

The translation rotor and bivector satisfying these conditions can be defined as:

$$V_1 = 1 - \tfrac{1}{2}\tau v_{31} \wedge v_{12} = \exp(-\tfrac{1}{2}\tau\beta_1),$$

where $\beta_1 = v_{31} \wedge v_{12}$.

The translation rotors (i.e. six-dimensional transformations) for translations along the other axes of the initial dimensional space can be determined through cyclic permutation with the bivectors all commuting. The translation vectors for all the axes can be generalized into an initial translation rotor over $\vec{t} = \tau_1\hat{e}_1 + \tau_2\hat{e}_2 + \tau_3\hat{e}_3$ that can be defined as:

$$V(\vec{t}) = \exp(\tfrac{1}{2}[\tau_1 v_{12} \wedge v_{31} + \tau_2 v_{23} \wedge v_{12} + \tau_3 v_{31} \wedge v_{23})$$

in the $\mathbb{R}^3$ coordinate space.

In the $\mathbb{R}^{3,3}$ coordinate space, the general translation rotor (six-dimensional translation transformation) can be defined as:

$$t \equiv \iota(e_0 \wedge \vec{t}) = \tau_1 v_{01} + \tau_2 v_{02} + \tau_3 v_{03},$$

$$V(\vec{t}) = \exp(-\tfrac{1}{2} t \cdot H),$$

$$H = v_{23} \wedge v_{31} \wedge v_{12}$$

where H may be referred to as a horizon trivector.

Perspective Transformations

An example perspective transformation is described in relation to a perspective transformation along a first axis of the initial three-dimensional space, in this example using the $\hat{e}_1$ direction vector. Similar perspective transformations may be applied with the other axes of the initial three-dimensional space, and/or with other initial dimensional spaces.

Perspective transformations can be used to transform an improper point (direction $\vec{u}$) into a proper point in the same direction with a scaling factor to make all directions end up in the same focal plane. In the four-dimensional space $V^4$, a perspective transformation having a focal length 1/f in the $\hat{e}_1$ direction transforms $\hat{e}_1$ to $\hat{e}_1 + f\hat{e}_0$. The effects of this example perspective transformation on the null vectors $v_{31}$ and $v_{12}$, the $f_1$-perspective rotor and bivector can be defined as:

$$V_{f1} = \exp(-\tfrac{1}{2}f\beta_{f1}) = 1 - \tfrac{1}{2}f\beta_{f1},$$

$$\beta_{f1} = v_{03} \wedge v_{02}$$

A general perspective transformation in $V^4$ using a vector $\vec{f}$ can be defined as the rotor (four-dimensional perspective transformation):

$$V_f = \exp(\tfrac{1}{2}[f_1 v_{02} \wedge v_{01} + f_2 v_{03} \wedge v_{01} + f_3 v_{01} \wedge v_{02})$$

In the $\mathbb{R}^{3,3}$ coordinate space, the general perspective rotor (six-dimensional perspective transformation) can be defined by:

$$f \equiv \iota((e_0 \wedge \vec{f})^*) = f_1 v_{23} + f_2 v_{31} + f_3 v_{21},$$

$$V_f = \exp(\tfrac{1}{2} f \cdot O),$$

$$O = v_{01} \wedge v_{02} \wedge v_{03},$$

where O is the line bundle at the origin.

Shearing Transformations

An example shearing transformation is described in relation to a shearing transformation along a first axis of the initial three-dimensional space, in this example using the $\hat{e}_2$-direction vector. Similar shearing transformations may be applied with the other directions of the initial three-dimensional space, and/or with other initial dimensional spaces.

The null 2-blade $\beta_\sigma = v_{12} \wedge v_{02}$ can be used to produce a shear transformation. The shearing transformation into the $\hat{e}_2$-direction that provides the effect of $\hat{e}_3 \to \hat{e}_3 + \sigma_{32} \hat{e}_2$ in $V^4$ can be defined as the rotor (six-dimensional transformation) $V_\sigma = \exp(-\sigma_{32} \beta_\sigma / 2)$. By examining the effects on the null vectors in $\mathbb{R}^{3,3}$, the 2-blade can then be written as:

$$\beta_\sigma = M_*[\iota(e_0 \wedge \hat{e}_3)] \wedge \iota(e_0 \wedge \hat{e}_2)$$

where $M_*[L] = -MLM^{-1} = -MLM$ and $M \equiv \epsilon_1^- \epsilon_2^- \epsilon_3^-$. Note that six shears can be defined for a shear along x in any of the remaining two directions of the initial three-dimensional space.

Rotational Transformations

An example rotational transformation is described in relation to a rotational transformation within a first plane of the initial three-dimensional space, in this example using the $e_2 e_3$-plane. Similar rotational transformations may be applied with the other planes of the initial three-dimensional space, and/or with other initial dimensional spaces.

In one example, the six-dimensional rotational transformation $v_{02} \to \cos \lambda\, v_{02} + \sin \lambda\, v_{03}$ in $\mathbb{R}^{3,3}$ can be shown to represent the transformation $\hat{e}_2 \to \cos \phi \hat{e}_2 + \sin \phi\, \hat{e}_3$ in $V^4$ that defines a rotation in the $e_2 e_3$-plane. The bivector for a rotation in the $e_2 e_3$-plane can be defined as:

$$\beta_{\phi 23} = \tfrac{1}{2}(v_{02} \wedge v_{12} - v_{03} \wedge v_{31}) = \tfrac{1}{2}(\epsilon_2^+ \epsilon_3^+ - \epsilon_2^- \epsilon_3^-).$$

The above bivector is not a blade. Through cyclic permutations, a general six-dimensional rotation transformation can be defined as:

$$\beta_\phi = b_{23} \beta_{\phi 23} + b_{31} \beta_{\phi 31} + b_{12} \beta_{\phi 12},$$

where $b_{12}^2 + b_{23}^2 + b_{31}^2 = 1$ and rotor $\exp(-\phi B)$.

Squeezing/Shearing/Lorentz Transformations

An example position Lorentz transformation is described in relation to a position Lorentz transformation within a first plane of the initial three-dimensional space, in this example using the $e_2 e_3$-plane. Similar position Lorentz transformations may be applied with the other planes of the initial three-dimensional space, and/or with other initial dimensional spaces.

In one example, the six-dimensional squeezing transformation $v_{02} \to \cosh \lambda v_{02} + \sinh \lambda v_{03}$ in $\mathbb{R}^{3,3}$ can be shown to represent the three-dimensional transformation $\hat{e}_2 \to \cosh \lambda \hat{e}_2 + \sinh \lambda \hat{e}_3$, which represents a position Lorentz transformation in the $e_2 e_3$-plane. The bivector for a squeeze in the $e_2 e_3$-plane can then be defined as:

$$\beta_{\lambda 23} = -\tfrac{1}{2}(v_{02} \wedge v_{12} + v_{03} \wedge v_{31}) = \tfrac{1}{2}(\epsilon_2^+ \epsilon_3^- - \epsilon_2^- \epsilon_3^+).$$

This above bivector is not a blade. Through cyclic permutations, a general six-dimensional Lorentz transformation can be defined as:

$$\beta_\lambda = b_{23} \beta_{\lambda 23} + b_{31} \beta_{\lambda 31} + b_{12} \beta_{\lambda 12}$$

where $b_{12}^2 + b_{23}^2 + b_{31}^2 = 1$.

Pinching Transformations

An example pinching transformation is described in relation to a pinch transformation within the initial three-dimensional space. Similar pinch transformations may be applied with the other null vectors of the initial three-dimensional space, and/or with other initial dimensional spaces.

An example pinching transformation can be defined as:

$$V_{\pi 1} = e^{-\pi 1 \beta_{\pi 1}/2} = e^{\pi 1 (v_{01} \wedge v_{23})/2}$$

The pinching transformation may leave all the null vectors invariant, apart from transforming $v_{01}$ to $e^{\pi 1} v_{01}$ and transforming $V_{23}$ to $e^{-\pi 1} v_{23}$.

Axis Scaling/Dilation Transformations

An example scaling transformation is described in relation to a scaling transformation along a first axis of the initial three-dimensional space, in this example using the $\hat{e}_1$-direction vector. Similar scaling transformations may be applied with the other directions of the initial three-dimensional space, and/or with other initial dimensional spaces.

In one example, a dilation transformation can be represented as $\hat{e}_1 \to e^{\gamma} \hat{e}_1$. A re-scaling transformation to unit determinants can be defined using:

| | | |
|---|---|---|
| $v_{01} \to e^{\gamma/2} v_{01},$ | $v_{02} \to e^{-\gamma/2} v_{02},$ | $v_{03} \to e^{-\gamma/2} v_{03},$ |
| $v_{23} \to e^{-\gamma/2} v_{23},$ | $v_{31} \to e^{\gamma/2} v_{31},$ | $v_{12} \to e^{\gamma/2} v_{12},$ |

Using the pinching transformations defined herein above, re-scaling can be achieved by scaling $v_{01}$ and $v_{23}$ by $e^{\gamma/2}$ and $e^{-\gamma/2}$ by the 2-blade $\beta_{\pi 1}$ and its rotor $$\exp\left(-\frac{\gamma \beta_{\pi 1}}{4}\right) = \exp(\gamma v_{01} \wedge v_{23}/4),$$

along with corresponding pinches in the $\hat{e}_2$ and $\hat{e}_3$ directions. This provides an $\hat{e}_1$-scaling bivector and rotor:

$$V_{\gamma 1} = \exp(\gamma(v_{01} v_{23} - v_{02} \wedge v_{31} - v_{03} \wedge v_{12})/4) = \exp(-\beta_{\gamma 1} \gamma/2),$$

$$\beta_{\gamma 1} = \tfrac{1}{2}(v_{23} \wedge v_{01} - v_{31} \wedge v_{02} - v_{12} \wedge v_{03}).$$

An arbitrary scaling transformation can be defined using a logarithmic gain vector $\vec{g} = \gamma_1 \hat{e}_1 + \gamma_2 \hat{e}_2 + \gamma_3 \hat{e}_3$, and multiple rotors for scaling in each direction. The bivectors in the exponents commute, and the six-dimensional gain vector can be defined as:

$$\vec{g} = \exp((\gamma_1 - \gamma_2 - \gamma_3) v_{01} \wedge v_{23} + (-\gamma_1 + \gamma_2 - \gamma_3) v_{02} \wedge v_{31} + (-\gamma_1 - \gamma_2 + \gamma_3) v_{03} \wedge v_{12})/4$$

While the gain vector defined above may appear complex, the use of this six-dimensional transformation may nonetheless simplify the computational process for a scaling transformation as compared to existing computational methods that often require the use of large matrices.

Note that the $\beta_{\pi i}$ are 2-blades (i.e. $\beta_{\pi i}^2=1$), but the $\beta_\gamma$ are not.

The transformations defined herein above can be implemented as processing modules within the data processing system 100. The data processing modules can be incorporated into a combined data processing application or implemented directly through algebraic code definitions. As illustrated, in some examples each six-dimensional transformation can be determined as the exponential of a signed linear combination of the bivectors from Table 2.

The inputs received from a user at 220 can be associated with initial transformations by specifying the three-dimensional transformations directly and/or by the data processing unit 112 determining the three-dimensional transformations from the input commands. For example, in the case of generating fractal trees or mountains, a user may input a specified fractal equation or set of commands defining the iterative steps for tree or mountain branching in each dimension. The data processing unit 112 may convert these commands directly to the six-dimensional transformations based on the bivectors $v_{ij}$. In some cases, a user may input a series or sequence of commands (desired formations/transformations) in a single input (e.g. a fractal equation). The entire series of commands may be mapped to the corresponding six-dimensional transformations. The series of six-dimensional transformations may be continuously updated based on changes to the data object being transformed.

Returning to method 200, once the six-dimensional data transformations are determined at 240, an updated data set can be calculated by applying the six-dimensional set of data transformations (from 240) to the at least one data object at 250. For example, an updated image may be determined by applying the six-dimensional set of image transformations to the at least one initial image object.

In some cases, the set of data transformations may be determined as a sequence of data transformations. The sequence of data transformations may include a plurality of data transformations. The sequence of data transformations may define a sequential order for the plurality of data transformations. The updated data set may then be determined by applying each of the six-dimensional transformations to the at least one initial data object in the sequential order.

The sequence of data transformations may be applied in an iterative fashion. An initial six-dimensional transformation can be applied to the at least one initial data object. The initial six-dimensional transformation can be defined as the first data transformation in the sequential order. An intermediate updated data set may be calculated. The intermediate updated data set can include the result of applying the six-dimensional transformation to the at least one data object. A subsequent six-dimensional transformation can be applied to the intermediate updated data set. The subsequent six-dimensional transformation can be defined as the subsequent image transformation in the sequential order. The process of calculating an intermediate updated data set and applying the subsequence six-dimensional transformation can be repeated until the six-dimensional transformations corresponding to all of the transformations in the sequence of data transformations have been applied.

The six-dimensional transformations can be configured to operate on the initial dimensional space (e.g. a three dimensional space). Thus, the six-dimensional transformations need not be converted back to the initial dimensional space.

For example, the outputs of the six-dimensional transformations can be projected back onto the three-dimensional coordinate system as a set of geometry preserving projective collineations. Optionally, the data processing unit 112 may apply the dynamic forces to modify or tweak the projection of the six-dimensional transformations back to the initial three-dimensional space.

In some examples, one or more dimensions of the data set may be embedded directly into six-dimensions. In such cases, the updated data in those dimensions can be output directly to the initial dimensional space and the remaining dimensions can be projected back to the initial dimensional space.

The output from the projected six-dimensional transformations may include an array of dimensional vectors corresponding to the initial dimensional space. For example, the array may include (3+1) dimensional vectors for a video object or virtual reality object defined in four dimensions. The fourth coordinate can be defined as the time index for the video object or virtual reality object that is otherwise displayed in three-dimensions.

The array may be included in an output lattice. The size of the lattice may be defined based on the output resolution required by the rendering module 140. For example, the lattice size may be defined based on the resolution of the graphic image of a video object or virtual reality object. The lattice may also be indexed with additional object attributes, such as color or intensity. In some examples, indexing may be implemented using binary or hexadecimal. The output lattice can be provided to the rendering module 140 to permit display by a three-dimensional graphic display 116.

Figure 3:
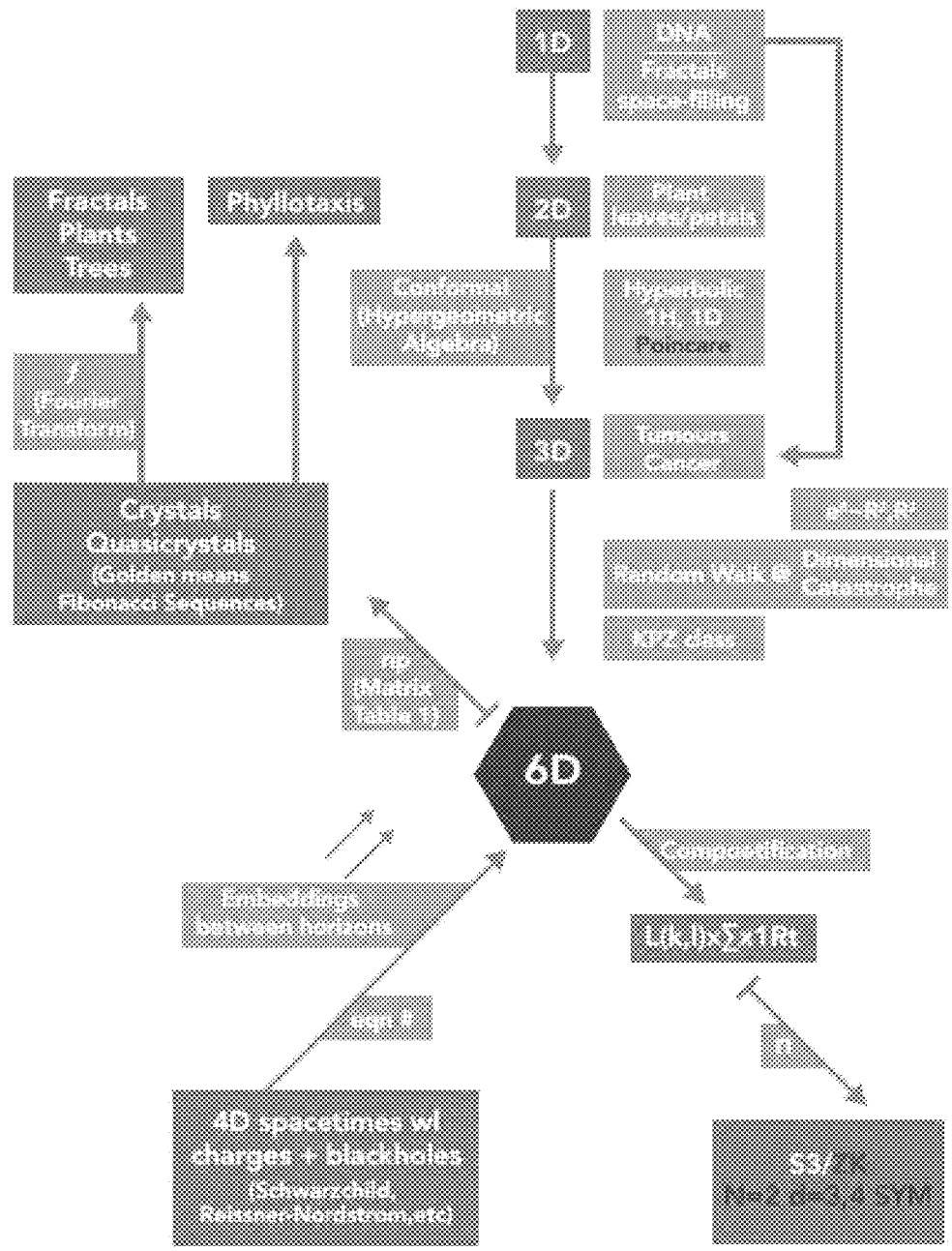
FIG. 3 is a block diagram illustrating examples of data represented in different dimensional spaces in accordance with an embodiment.

Referring now to FIG. 3, shown therein is an example flow diagram illustrating relationships between various data objects and representative dimensional spaces. As shown in FIG. 3, various types of data objects may be defined in different initial dimensional spaces. For example, fractals may initially be defined in a one-dimensional space, image or video data objects of plants may initially be defined in a two-dimensional space, data objects such as growth models or three-dimensional models of cancer cells may initially be defined in a three-dimensional space, video objects may initially be defined in a four-dimensional space and so forth. These data objects can be converted to a six-dimensional dimensional space and projected back to the output space.

Figure 4:
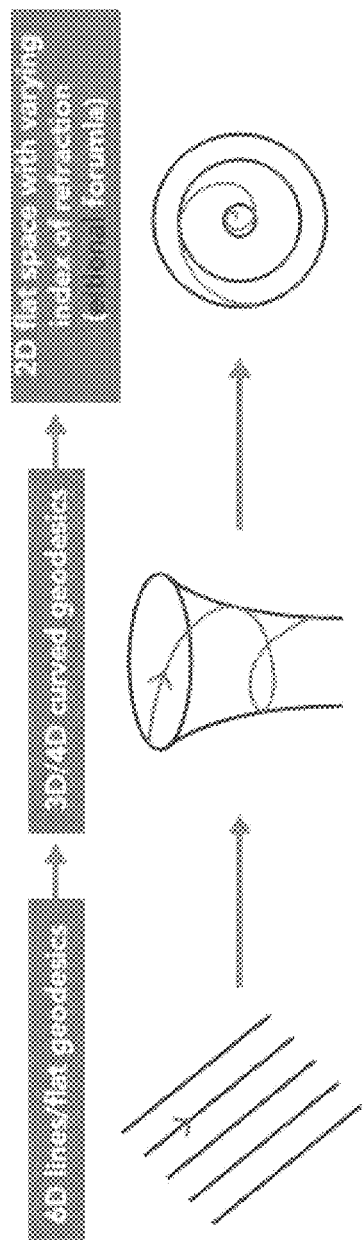
FIG. 4 is a block diagram illustrating examples of data represented in different dimensional spaces in accordance with an embodiment.
Figures 7A, 7B:
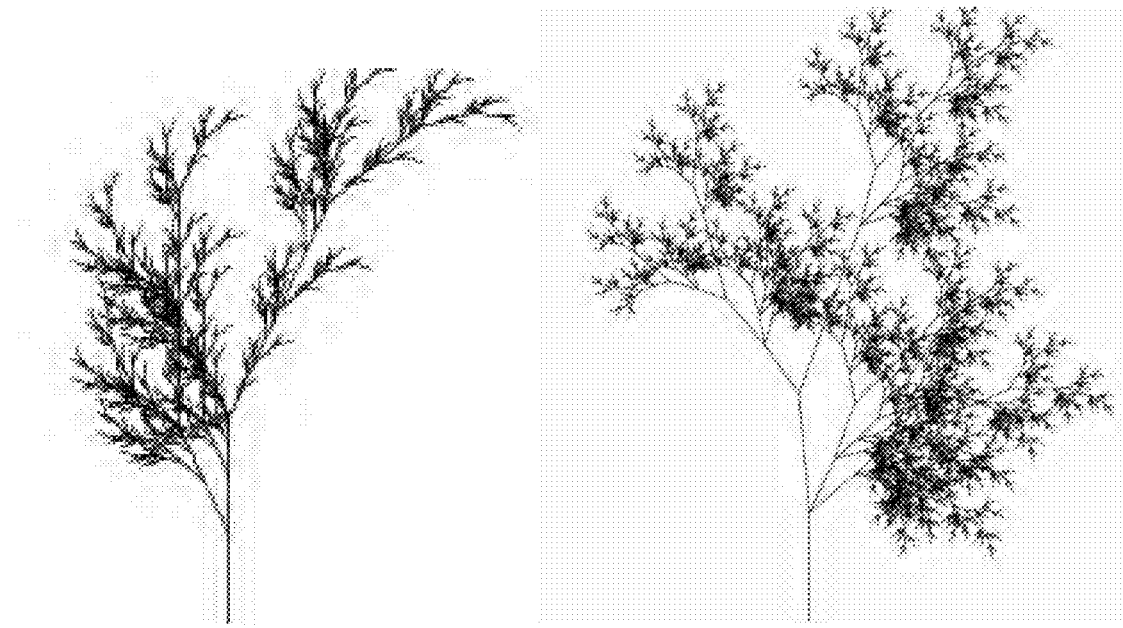
FIGS. 7A-7D illustrate an example sequence of data objects that may be generated by a system configured using the pseudocode shown in FIG. 6.
Figures 7C, 7D:
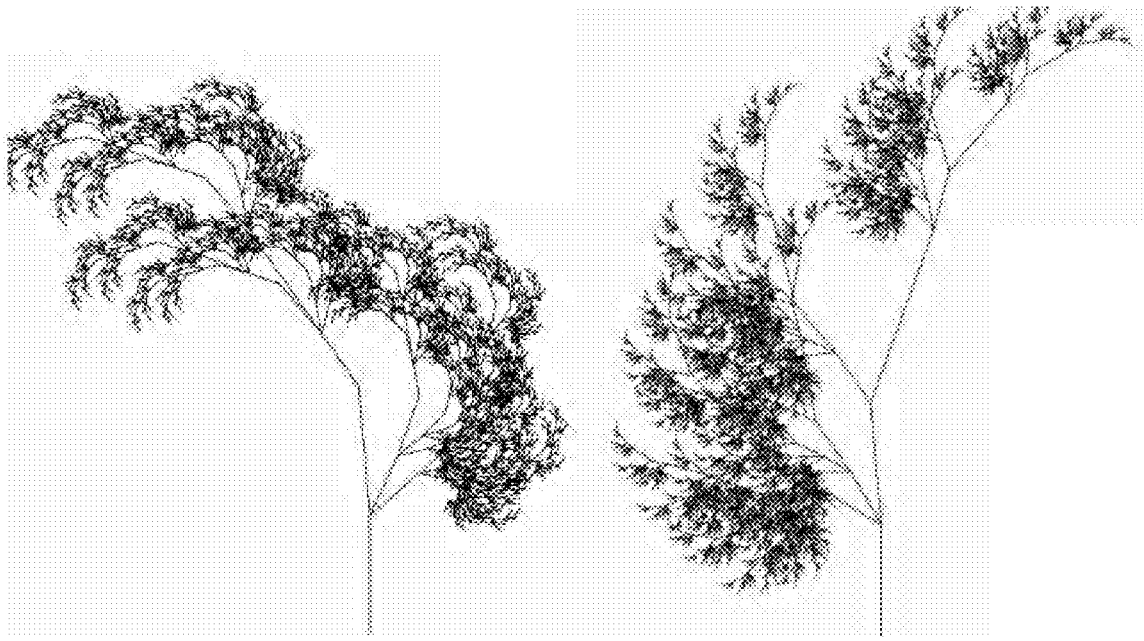

FIG. 4 illustrates an example mapping of projections between various dimensional spaces. The mappings shown in FIG. 4 illustrate an example of how objects defined within the six-dimensional space may be projected onto to objects in a four-dimensional space, three-dimensional space, and how those objects can be further projected to a two-dimensional space.

Quasicrystal Projection Method

The following is a general description of a quasicrystal projection method and other features set out herein that may be used by itself or in combination with one or more embodiments disclosed herein, including a data processing system, and a data processing method. The following description contains various features of a quasicrystal projection method that may be used individually or in any combination or sub-combination.

In some examples, the six-dimensional transformations can be projected to a three-dimensional system using a generalized quasicrystal projection. An example projection matrix between a six-dimensional space and a three-dimensional space is shown below:

$$\begin{pmatrix} 1 & \phi & 0 & -1 & \phi & 0 \\ \phi & 0 & 1 & \phi & 0 & -1 \\ 0 & 1 & \phi & 0 & -1 & \phi \end{pmatrix}$$

where ϕ is the golden ratio.

The projection matrix illustrated above defines a projection from a six-dimensional lattice or sublattice onto a three-dimensional subspace with an irrational slope along at least one coordinate axis. The result of this projection is that simple sublattices in the six-dimensional space can be used to generate many complex data objects, such as fractal-like images useful in computer generated imagery.

While the projection matrix illustrated above is defined using the golden ratio ϕ, various other projection matrices may be used so long as they contain an irrational number. The irrationality of the projection matrix can provide aperiodicity in the resultant projection.

Implementing the projection matrix using the golden ratio may provide the result that the Fibonacci sequence is reproduced along any linear subspace on the three-dimensional subspace that is being projected onto. In particular, the pattern of linear tile number frequency may follow a Fibonacci sequence. If ϕ where replaced by any silver mean, the pattern of linear tile number frequency may be adjusted to a sequence whose eigenvalue of the generating polynomial's matrix is that silver mean. The projection matrix defined above can project simple sublattices of a simple cubic six-dimensional lattice onto a three-dimensional space.

A cubic lattice structure in six-dimensional can be passed to a dual quasicrystal (Fourier) lattice (where fractal properties may be seen). The projected graphs, although often quite simple in the six-dimensional space, can result in intricately detailed patterns (e.g. fractal plants) in the three-dimensional space, with nodes on the dual quasicrystal lattice. In one example, the projection from the six-dimensional space to the three-dimensional space may be represented as:

$$G_6 \subset \mathbb{Z}^6 \to_{\pi p} \Lambda \in \mathbb{R}^3 \to_F \Lambda^\vee \in \mathbb{R}^{3\vee}.$$

A subgraph with nodes on the basis at integer lattice $\mathbb{Z}^6$ can be projected via a quasicrystal projection onto an irrational three-dimensional subspace P. This subspace can then be Fourier transformed to the dual three-dimensional lattice $\Lambda^\vee$. The resulting three-dimensional lattice can include a set of image objects (e.g. fractal trees and plant objects) from which a desired subset can be selected.

Taking the simple example of a one dimensional output space, an aperiodic tiling can be defined based on two intervals by projecting from a regular square lattice $\mathbb{Z}^2$ in a two-dimensional space. A one-dimensional lattice can be defined to lie along a line E:={(x,y): y=qx, q∈$\overline{\mathbb{Q}}$} of irrational slope passing through an original lattice point. The line can be defined not to intersect with any other point of the lattice, and its distance to each lattice point densely fills the real line. An example illustration of the aperiodic tiling resulting from a quasi-crystal projection from the two-dimensional space into the one-dimensional space is shown in FIG. 10.

Figure 10:
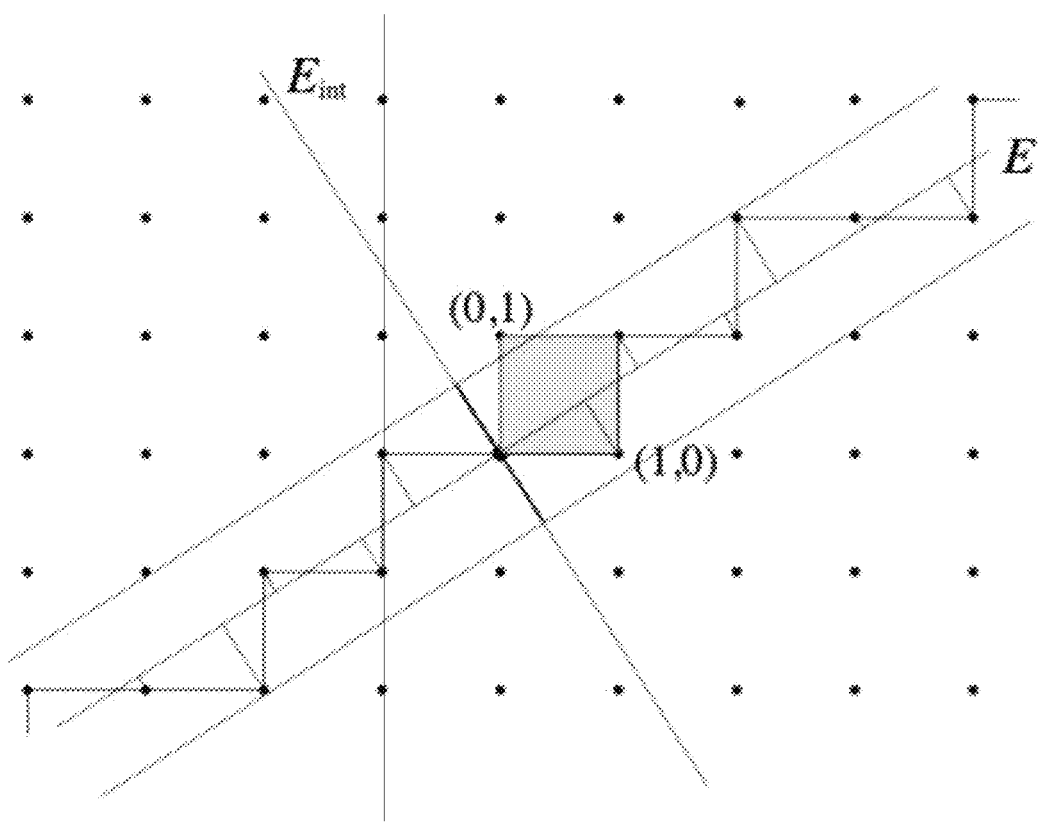
FIG. 10 is an example illustration of a quasicrystal projection in accordance with an embodiment.

FIG. 10 illustrates a simplified example of a projection from a two-dimensional space to a one-dimensional space. In particular, the projection shown in FIG. 10 illustrates a projection onto a linear subspace (a line in this case) with an irrational slope. The regular simple square two-dimensional lattice gets projected onto an aperiodic lattice of two sizes of 'tiles' or lattice spacings. The pattern of the tile repetition is not periodic, but any sequence of tile pattern can be found at some point down the lattice.

In the case of a projection from a six-dimensional space to a three-dimensional space, the resulting tile patterns can include any existing quasicrystal patterns, including manner found in natural objects. As an extension, a simple connected cubic sublattice in the six-dimensional space can be projected onto such a three-dimensional subspace to provide many tree and fractal patterns useful in computer generated imagery. A substantially infinite number of such patterns can be generated using a single simple 3×6 matrix multiplication.

Returning to the example of the projection from a two-dimensional space to a one-dimensional space, the unit square at the origin C can be translated along the line E to obtain a strip Σ=E×C. The strip contains a single sequence of lattice points $\Sigma_0 \in \Sigma$ which project (perpendicularly on E by map π) onto an open aperiodic tiling of E, $T_1 = \pi(\Sigma_0)^c \in E$, where )$^c$ means the local set complement. The tiling is composed of tiles of two lengths, a and b, that are independent over $\overline{\mathbb{Q}}$. The tiles of each length can occur in random sequence, but such that any sequence occurs infinitely often at random along the sequence. Any finite length sequence of points in Σ can then project on the side of the unit square C, and fit inside a non-empty open subset of C. Accordingly, by translating Σ perpendicularly to E infinitely many lattice points can enter and leave the Σ. This allows an immensely large number of different reoccurrences of the same finite sequence to be provided through a translation of the lattice in $\mathbb{Z}^2$. As a result, the sequence of a and b tiles defined in binary can form normal irrational numbers—that is a set where any sequence eventually appears infinitely often depending on its length. The size of such a translation is random, but for Liouville numbers grows exponentially in the sequence length.

Using a line of slope as the golden ratio $\varphi = (1+\sqrt{5})/2$, the relative and accumulative abundances of both tiles of length a=φ and b=1/φ can be seen to follow a Fibonacci sequence.

The quasicrystal projection method can be generalized to arbitrary dimensions. In general, a projection $\pi_p: \mathbb{R}^n \to \mathbb{R}^p$ of a periodic lattice in $\mathbb{R}^n$ onto a p-dimensional subspace can generate aperiodic tilings of $\mathbb{R}^p$ given by a lattice $L = \pi_p(\mathbb{Z}^n)$ as its vertices. The projection is periodic if the plane onto which we project, $P \equiv \{\Sigma_{i=1}^n r_i^{(j)} x_i = 0\}_j^{n-p}$, is defined by a system of linear equations with rational coefficients. An aperiodic quasicrystal is obtained if such a p-subspace passes only through the origin and through no other point of $\mathbb{Z}^n$. This can occur if the coefficients in the equation of the plane are linearly independent over $\mathbb{Q}$.

By the projection method described above in relation to the two dimensional space up to $$\binom{n}{p}$$

different p-volume tiles may be found at each vertex, as projections of the hypercube faces onto P. If P is invariant under the action of a subgroup G of the point group of $\mathbb{Z}^n$, these tiles fall into different classes. Each class includes a different shape of tile. Tiles of the same shape are permuted by G.

Projecting from six dimensions down to three dimensions may provide an icosahedral aperiodic tiling. In this case, G may the orthogonal representation of the icosahedral symmetry group, which permutes $\mathbb{Z}^6$ splitting $\mathbb{R}^6 = E \oplus E'$ into two three-dimensional G-invariant subspaces E and E'. The projections $\pi$ and $\pi'$ of $\mathbb{Z}^6$ onto E and E' are $\mathbb{Z}$-modules, dense in E and E'. The projections of the vertices $\pm e_1$, $\pm e_2, \ldots, \pm e_6$ of the natural basis of $\mathbb{R}^6$ onto the 12 vertices of the regular icosahedra centred at the origin of E and E'. FIG. 11 illustrates an example of the icosahedron tiling pattern that may result with $20 = \binom{6}{3}$ different tiles built out of two different rhombohedra (10 repeats each).

Figure 12A:
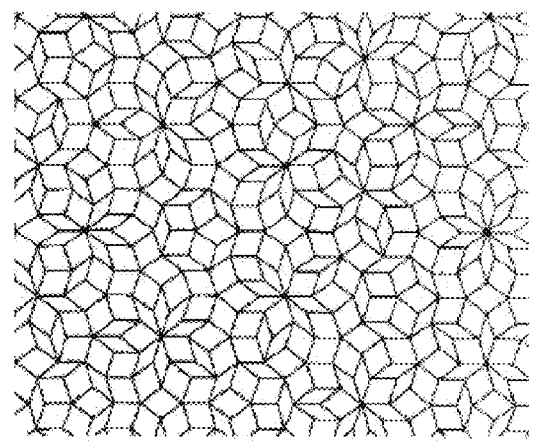
FIGS. 12A-12C are example illustrations of tiling projections that may be used in projection methods in accordance with an embodiment.
Figure 12B:
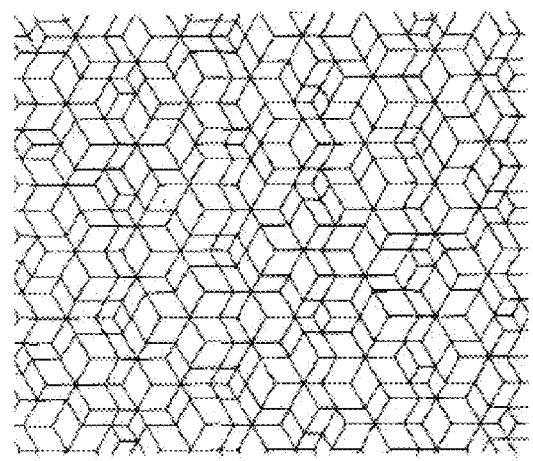
Figure 12C:
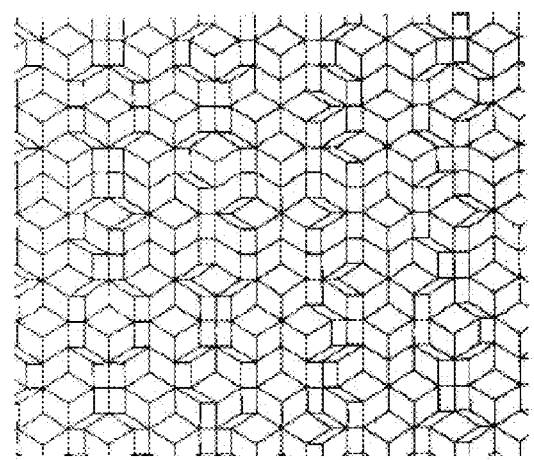

FIGS. 12A-12C illustrate two-dimensional projections of the icosahedral tiling of FIG. 11 onto a plane perpendicular to axes of 5, 3, and 2-fold symmetries respectively. As shown in FIGS. 12A-12C, the projections are aperiodic. Self-similarity also holds for the projections shown in FIGS. 12A-12C. FIG. 11A illustrates the three separate symmetry axes of projection that can be used to obtain the two-dimensional tiling projections shown in FIG. 12.

As in the one dimensional case, the 'strip' $\Sigma = E \times C^6$ (where $C^6$ is the unit hypercube of $\mathbb{R}^6$) can be translated yielding an uncountable number of different aperiodic tilings of P.

Figure 13A:
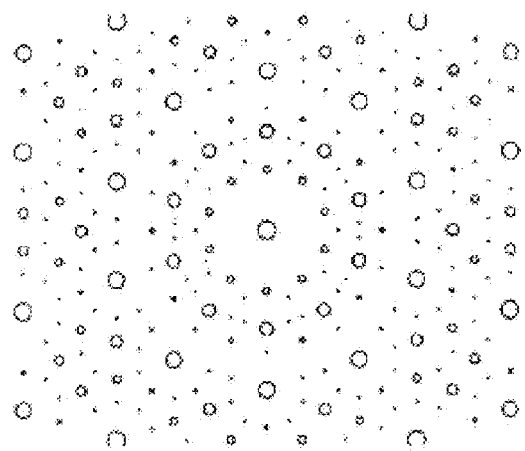
FIGS. 13A-13C are example illustrations of transformed tiling projections corresponding to the tiling projections of FIGS. 12A-12C that may be used in projection methods in accordance with an embodiment.
Figure 13B:
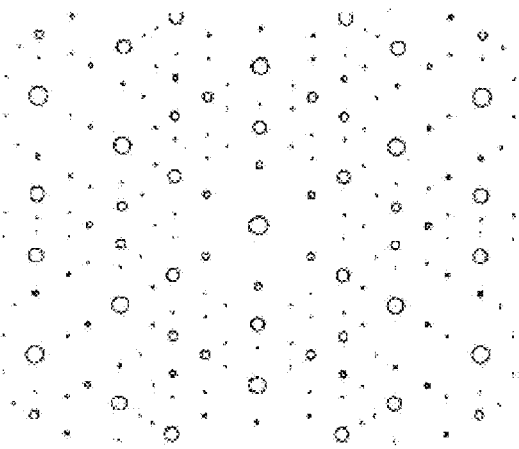
Figure 13C:
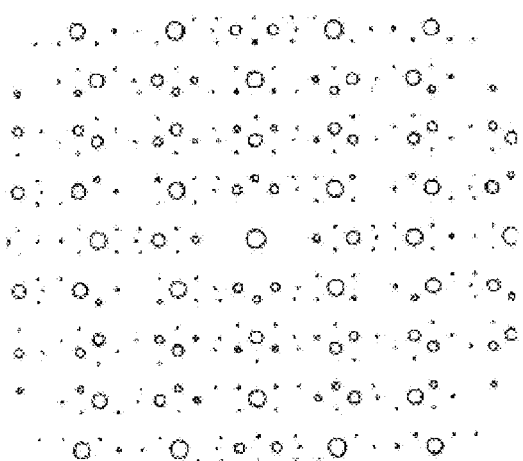

The diffraction patterns uniquely classify such aperiodic crystal structures, just as in the periodic case. FIG. 13A-13C show Fourier transforms of the icosahedral tiling projection lattices of FIGS. 12A-12C respectively. In FIGS. 13A-13C, amplitudes are represented by larger circles.

The Fourier transform can be defined as a sum of weighted Dirac delta-functions supported on the $\mathbb{Z}$-module generated by the projections of the basis vectors (the lattice L). All tilings of the same tiles have the same Fourier transform, up to a phase in the amplitudes, illustrating the aperiodicity and self-similarity of the tiling projection. Consider the measure of the lattice points in the strip, $\Sigma \cap \mathbb{Z}^6$, $d_x = \chi \Sigma \sum_{\xi \in \mathbb{Z}^6} \delta(\chi = \xi)$, where $\chi \Sigma$ is the characteristic function of the p-strip, which is a product of sin c $x = \sin x/x$ functions. The measure of the tiling is $m = \Sigma_{\xi \in} \mathbb{Z} \sigma \chi \Sigma(\xi) \delta(x - \pi(\xi))$. The Fourier transform can be found by simple convolution.

The vertices $\vec{x}$ of a quasi-lattice are at the intersections of three planes, and so satisfy three simultaneous equations:

$$e_i \cdot \vec{x} = x_{n_i}, e_j \cdot \vec{x} = x_{n_j}, e_k \cdot \vec{x} = x_{n_k},$$

where $i \neq j \neq k$, $e_i$ is the unit normal to the ith family of planes, and the $x_n$ are given by the general one dimensional aperiodic lattice distribution:

$$x_n = n + \alpha + \varphi^{-1} \lfloor n \varphi^{-1} + \beta \rfloor,$$

for the nth line of any grid. $\alpha$ and $\beta$ are any real numbers and may depend on the plane number. The indices i, j, k can run from to 0 to 5 for a vertex model (axis of symmetry passing through a vertex, etc.), 0 to 9 for a face model, and 0 to 14 for an edge model.

The system of equations for $\vec{x}$ above can be solved. The three-dimensional Fourier transform of the quasiperiodic lattice can be defined as:

$$F_3(\vec{k}) = \sum_{i<j<k} \sum_{n_i,n_j,n_k} \exp(i\vec{k} \cdot \vec{x})$$

Using the vertex equations shown above, it can be shown that $$i\vec{k} \cdot \vec{x} = i\vec{k} \cdot (u_{ijk} x_{n_i} + u_{jik} x_{n_j} + u_{kij} x_{n_k}),$$

with $u_{ijk} = e_j \times e_k / e_i \cdot (e_j \times e_k)$

Accordingly, the Fourier Transform can be represented by:

$$F_3(\vec{k}) = \sum_{i<j<k} f_1(\vec{k} \cdot u_{ijk}) f_1(\vec{k} \cdot u_{jki}) f_1(\vec{k} \cdot u_{kij})$$

To ensure that the Fourier Transform function defined above does not vanish, the vector $\vec{k}$ can be defined with the form:

$$\vec{k} = \frac{2\pi}{\sqrt{5}} \left[\left(p_i + \frac{q_i}{\varphi}\right) e_i + \left(p_j + \frac{q_j}{\varphi}\right) e_j + \left(p_k + \frac{q_k}{\varphi}\right) e_k\right],$$

which shows a 1:1 correspondence with the regular six-dimensional lattice $\mathbb{R}^6$.

The unit normals $e_i$ described above, can be defined as:

$$(1+\varphi^2)^{-\frac{1}{2}}(0, \varphi, \pm 1)$$

for a vertex model, plus cyclic permutations for the other normals; $\sqrt{3}^{-1}(0, \pm \varphi^{-1}, \varphi)$ for a face model, plus cyclic permutations and $(1,1,1)/\sqrt{3}$ for the other normals; and $(1,0,0)$, $(0,1,0)$, $(0,0,1)$ for an edge model, plus cyclic permutations of $(\pm \varphi, \pm \varphi^{-1}, 1)/2$ for the other normals. The corresponding diffraction patterns can be seen to lie on planes passing through the origin of reciprocal k-space, with the planes $k_z = 0$, $k_x + \varphi k_z = 0$, and $\varphi^2 k_x + k_z = 0$ respectively normal to the 2×2, fivefold and threefold symmetries.

Figure 14:
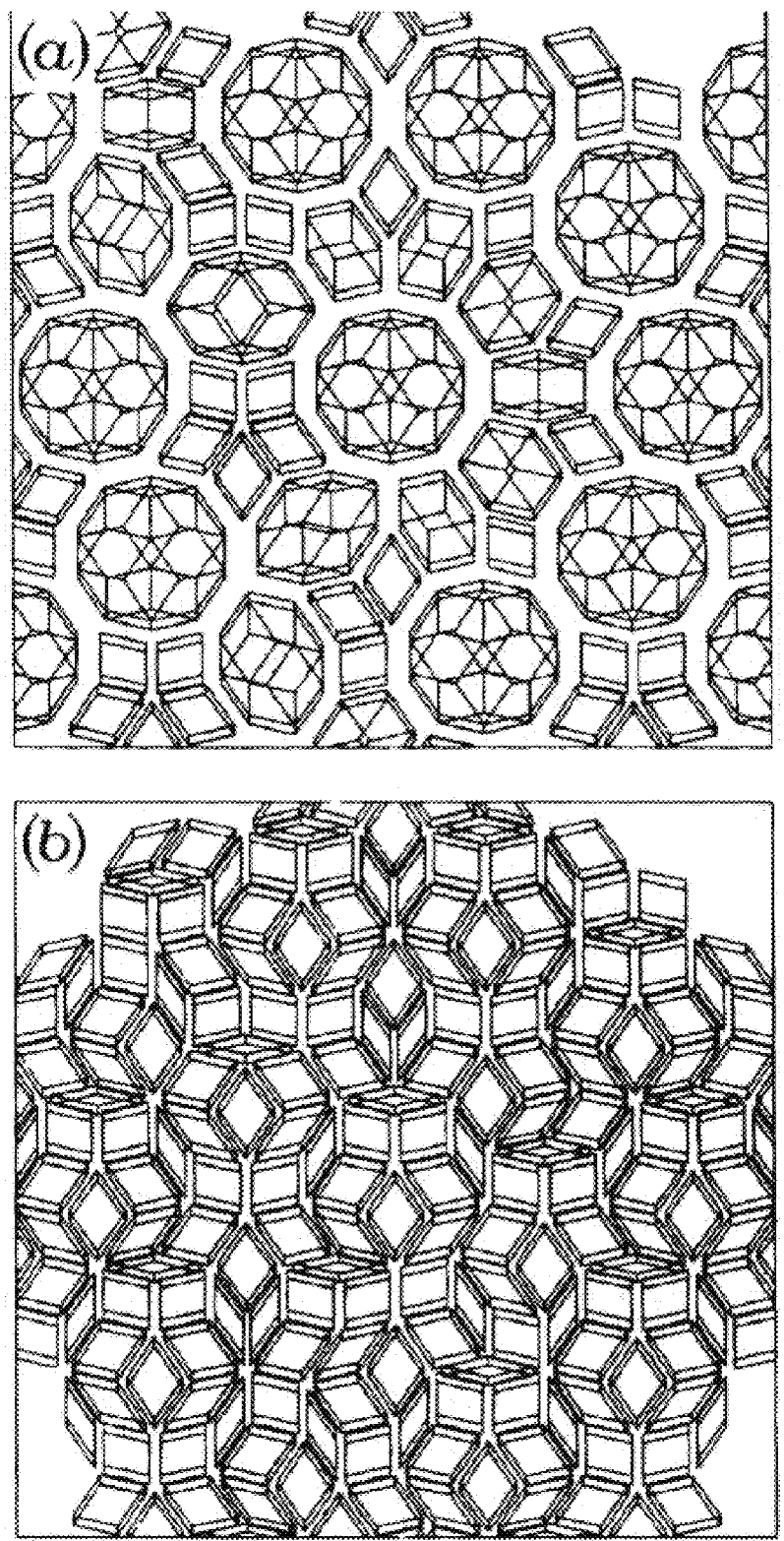
FIGS. 14A-14B are example illustrations of a layer of three-dimensional tiling that may be used in projection methods in accordance with an embodiment.

For the icosahedral projection model, the vertex model case can be used. The diffraction peaks are in 1:1 correspondence with the six dimensional hypercubic lattice. The icosahedral quasicrystal rhombohedral tiling described above illustrates an example of a direct projection of the unit regular periodic lattice $\mathbb{R}^6$ onto a three-dimensional space. FIGS. 14A and 14B illustrate examples of layers of the resultant three-dimensional icosahedral quasicrystal tiling.

Projection Method Using Compactification

The following is a general description of a compactification and projection method and other features set out herein that may be used by itself or in combination with one or more embodiments disclosed herein, including a data processing system, and a data processing method. The following description contains various features of a compactification and projection method that may be used individually or in any combination or sub-combination.

An alternate method of projection can be defined using a compactification and then a projection following compactification. Several new methods of calculating topological invariants in three dimensions and four dimensions can also be performed using this process.

An example six-dimensional space to compactify on is in terms of the Lenz space $L(k, 1) \approx S^3 / \mathbb{Z}_k$:

$$\mathbb{R}^{3,3} \to L(k,1) \times \Sigma \times \mathbb{R},$$

An example compactification can be defined as:

$$\mathbb{R}^6 \to L(k,1) \times \Sigma \times \mathbb{Z}_t^1 \to_\pi S^3 / \mathbb{Z}_k$$

where L(k, 1) is the Lenz space, $\Sigma$ is any Riemann surface in the other two time dimensions (of the three time dimensions in the six-dimensional space), and $\mathbb{R}$ is the standard time dimension (which may be embedded directly from the initial dimensional space).

An initial six-dimensional supersymmetric N=(0,2) five-brane theory can be defined with N 5-branes. This five-brane theory can be compactified on a manifold $\mathbb{M}_3$. In some cases, the manifold $\mathbb{M}_3$ may include knots and tangles or punctures.

A supersymmetric moduli space $\mathcal{M}_{SUSY}$ on $M_3=S^1\times\mathbb{R}^2$ can be defined as the moduli space of flat connections valued in the complex gauge group G, $\mathcal{M}_{flat}(G_\mathbb{C},\mathbb{M}_3)$.

A partition function Z on the Lenz space $L(k, 1)\approx S^3/\mathbb{Z}_k$ can be defined as the Chern-Simons partition function in the gauge group at level k, where $$Z_{CS,k}(G_\mathbb{C},\mathbb{M}_3) = \int_{M_{flat}(G,\Sigma)} e^{k\oint_{\mathbb{M}_3}(dA\wedge A+A\wedge A\wedge A)}$$

The quantum group of invariants of $\mathbb{M}_3$ can be cateogrified using the quantum Q-cohomology $\mathcal{H}(T[\mathbb{M}_3])$.

The five-branes in the theory can be thought of as 'cigar' bundles on the $\mathbb{M}_3$ manifold. The five-brane can then be defined as $B_5$='cigar'$\times \mathbb{M}_3$, wherein the cigar can be considered as a tightly wound $\mathbb{R}^2$ with size $\hbar=\epsilon$.

A general manifold $\mathbb{M}_3$ can be defined as $\mathbb{M}_3=\Sigma\times S^1$, where $\Sigma$ is any Riemann surface. An initial compactification can then be defined as:

$\mathbb{R}^{3,3}\to \mathbb{R}_{time}\times$'cigar'$\times\Sigma\times S^1$.

With a form [w]$\in H^2(\Sigma)=\mathbb{Z}$, the bundles $\mathcal{L}^{\otimes k}\to\mathcal{M}_{flat}(G,\Sigma)=Bun_G$ give homologies and topological invariants related to partition functions, $\dim \mathcal{H}_{CS,k}(G,\Sigma)=kH\cdot$
$(\mathcal{L}^{\otimes k})=\int_{M_{flat}(G,\Sigma)} e^{kc_2(\mathcal{L})}\wedge Td,$ where Td is the Todd class of the connection form, and the partition function is the index of the Dirac spin operator.

In some examples, for each value of k, it can be shown that the partition function $Z_{L(k,1)}(T[\Sigma\times S^1])=\dim \mathcal{H}_{CS}(\Sigma,k)$. This allows the function to be restricted to the moduli space over the Higgs branch of N=2 3D $\mathcal{M}_H$. A $U(1)_\beta$ action on this moduli space acts on the gauge fields as $U(1)_\beta$: $(A,\Phi)\to(A,e^{i\beta}\Phi)$.

The Chern class can be denoted $w_I$. Using the graded homology $\mathcal{H}_{CS}=\otimes_n H_n$ and with $t=e^{-\beta}$, it can be shown that:

$$\dim \mathcal{H}_{CS}(\Sigma, k) = \sum_n t^n \dim H_n = \int_{M_H} e^{kw_I-k\beta\mu_I}\bigwedge Td[\mathcal{M}_H-\mu\beta]$$

As one example, $\Sigma$ can be defined as a Riemann surface of genus 2 in the extra two time dimensions of the six-dimensional space with the complex gauge group $G_\mathbb{C}=$ SL(2,$\mathbb{C}$). dim $\mathcal{H}_{CS}$ can then be expanded about $\beta=0$ to determine a set of integers for each k, as:

$$\dim\mathcal{H}_{CS}(SL(2,\mathbb{C}),\Sigma_{g=2}) = \frac{k^3}{6}+k^2+\frac{11}{6}k+1+$$
$$\left(\frac{k^3}{2}+3k^2-\frac{k}{2}-3\right)(t-1)+(k^3+8k^2-3k-3)(t-1)^2+\ldots$$

Returning again to method 200, the output data from the transformations performed at 250 may be projected to an output dimensional space (such as the initial dimensional space) at 260 to define an updated data set.

In some cases, e.g. where one or more dimensions are embedded into the alternate dimensional space, the embedded dimensions may be output directly to the output dimensional space. The remaining dimensions may then be projected.

The output from the projected six-dimensional transformations may include an array of dimensional vectors corresponding to the initial dimensional space. The array may be defined in an output lattice.

In some cases, at 260 the updated data set may be stored as a processed data set. For example, the processed data set may be stored in a non-transitory storage medium, such as memory unit 128.

Alternately or in addition, at 260 the updated data set may be rendered on a display 116. For example, the updated data set may define an updated image that can be displayed by display 116.

In one example, the array may include (3+1) dimensional vectors for a video object or virtual reality object defined in four dimensions. The fourth coordinate can be defined as the time index for the video object or virtual reality object that is otherwise displayed in three-dimensions.

The size of the lattice may be defined based on the output resolution required by the rendering module 140. For example, the lattice size may be defined based on the resolution of the graphic image of a video object or virtual reality object. The output lattice can be provided to the rendering module 140 to permit display by a three-dimensional graphic display 116.

The lattice may also be indexed with additional object attributes, such as color or intensity. In some examples, indexing may be implemented using binary or hexadecimal.

In some cases, the rendering module 140 may use a library, such as the Python Imaging Library or Visual Python to facilitate the display of the output data. Various alternate other output formats may be used depending on the ultimate program and/or display 116 used to present the data.

Referring now to FIG. 5, shown therein is example pseudocode that may be used to generate image data in accordance with an embodiment The pseudocode illustrated in FIG. 5 shows an example of Turtle L systems commands that may be used to generate a fractal image object. FIGS. 6, 8, 15A-15D, and 17A-17E illustrate further examples of pseudocode defined in Python that may be used to generate image data in accordance with the embodiments described herein.

In comparison to existing 3D programs for generating computer graphics, embodiments using the methods described herein for transforming data within six-dimensions may be simpler and use fewer lines of code. Embodiments described herein may provide a unified and simple transformation library that unifies transformations and space-time.

Many existing programs may require the use of arrays in which data is split into real and imaginary parts. This results in complex code and may put a greater burden on the use to manually perform calculations (e.g. when changing the number of arms of a fractal wisp). The use of arrays and two-dimensional complex numbers may also result in slower computations.

In contrast, embodiments described herein are not restricted to the use of two-dimensional complex numbers in calculating data transformations. Rather, six-dimensional hypercomplex numbers may be used in embodiments described herein to simplify the calculations performed.

Example Implementations for Generating Turtle and Fractal Patterns

Fractal patterns like the Mandelbrot and Julia sets are typically calculated using iterative computations in the complex plane. For the Julia set, the iteration can be defined with the form $z \rightarrow z^p + C$, where p is an integer constant, and z and C are complex numbers. For p=2 we can obtain the Mandelbrot set if C=z is allowed to vary. Given the isomorphism between complex numbers and vectors using the geometric product, we can define:

$$Z = x\hat{n}, C = c\hat{n}$$

The Julia iterator may then be re-expressed as:

$$Z \rightarrow *_{i=1}^{p} PZ + C,$$

using the geometric product $x*y = x \cdot y + x \wedge y$. The iterator, when using the geometric product, is in fact a mapping from vectors to vectors.

Figure 16:
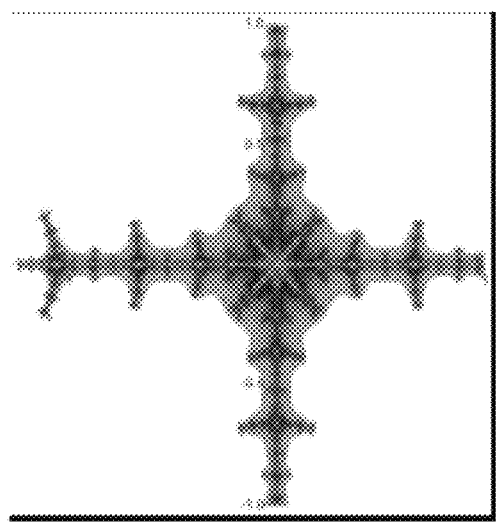
FIG. 16 is an example illustration of an image generated using the pseudocode shown in FIGS. 15A-15D in accordance with an embodiment.

FIGS. 15A-15D show an example of pseudocode that may be used to generate image data in accordance with an embodiment. The example pseudocode shown in FIGS. 15A-15D may be used to generate a higher dimensional Mandelbrot set iteration using a four-dimensional special case of the six-dimensional hypercomplex geometric algebra iteration discussed for p=2. The code illustrated in FIGS. 15A-15D is more concise and simple than other codes using complex number arrays. FIG. 16 illustrates an example of a fractal image object that may be generated using the pseudocode shown in FIGS. 15A-15D.

In embodiments described herein, arrays may still used, particularly when implemented in C for faster computation. However, the use of arrays may be restricted to output variables (e.g. output data sets), rather than the internal calculations associated with applying transformations.

Using traditional three-dimensional calculation methods, turtle transformations, such as rotations, pitches or rolls, can be calculated using three by three matrices. An example of a turtle command dictionary is shown in Table 3 below:

TABLE 3

| Turtle Command Dictionary | |
|---|---|
| Symbol | Procedure |
| F | Move forward while drawing a line |
| f | Move forward without drawing a line |
| + | Turn left |
| − | Turn right |
| ∧ | Pitch up |
| & | Pitch down |
| \ | Roll left |
| / | Roll right |
| \| | Turn around |
| $ | Rotate turtle to vertical |
| [ | Start a branch |
| ] | Complete a branch |
| { | Start a polygon |
| G | Move forward and draw a line without recording a vertex |
| . | Record a vertex in the current polygon |
| } | Complete a polygon |
| ~ | Incorporate a predefined surface |

TABLE 3-continued

| Turtle Command Dictionary | |
|---|---|
| Symbol | Procedure |
| ! | Decrement the diameter of segments (stems) |
| , | Decrement the current color index |
| % | Cut off the remainder of the branch |

Calculations using three by three matrices as in traditional three-dimensional calculations methods may be much less efficient than performing simple multiplications in geometric algebra (as in the six-dimensional transformations described herein above). Calculation using the six-dimensional transformations described herein above may also be implemented with a much smaller command alphabet.

Referring now to FIG. 6, shown therein is an example of pseudo code that may be used to generate a turtle image object. FIG. 6 illustrates an example of Turtle L system coding that can be used to generate plant image data. The pseudocode defined in FIG. 6 is implemented using the Turtle commands shown in Table 3. The command F specifies forward motion by a specified amount defined in the subsequent code, +/− specifies a left/right turn by a specified angle, [ specifies pushing the current state of the turtle onto a pushdown stack (Start a branch), and ] specifies popping the state from that stack and making it the current turtle state (complete a branch). The pseudocode illustrated in FIG. 6 can be used to generate data objects by defining a specified order of turtle commands for the drawing motion of a rendering program.

In the example pseudo code illustrated in FIG. 6, the turtle instructions can be configured to provide L system coding usable to model plant growth using six-dimensional transformations. A mapping between the turtle commands and the corresponding six-dimensional transformations can be defined, for instance in a library stored with the CGI program. This may enable the code to implement the six-dimensional transformation methods, as described above.

The pseudo code shown in FIG. 6 may permit the calculation and rendering of turtles in three and higher dimensions to be performed using the split signature six-dimensional geometric algebra. The six-dimensional transformations described herein can be used instead of complicated turtle dictionaries of commands. This can provide simplified and efficient multivector methods for computing turtles.

FIG. 7A-7D illustrates a sequence of image objects generated in accordance with the methods described herein. The images shown in FIG. 7A-7D may be generated using the pseudocode shown in FIG. 6.

Referring now to FIG. 8, shown therein is an example of pseudo code that may be used to generate a fractal image object. In the example pseudo code illustrated in FIG. 8, the image generation instructions can be configured to provide L system coding usable to generate fractal brain growth images using six-dimensional transformations.

The pseudocode illustrated in FIG. 8 illustrates how the sizes and colors of the branches of data objects can be adjusted over time, and how the growth rate and sequence can be adjusted. A mapping between the turtle commands and the corresponding six-dimensional transformations can be defined, for instance in a library stored with the CGI program. This may enable the code to implement the six-dimensional transformation methods, as described above.

In order to generate fractal image data, a user may specify a branching angle, and a fractal ratio between branching generations. Using the six-dimensional transformations described herein above (e.g. the Clifford algebra Cl(3,3)), rotations and branch size decrements can be specified by a single multivector.

Figure 9A:
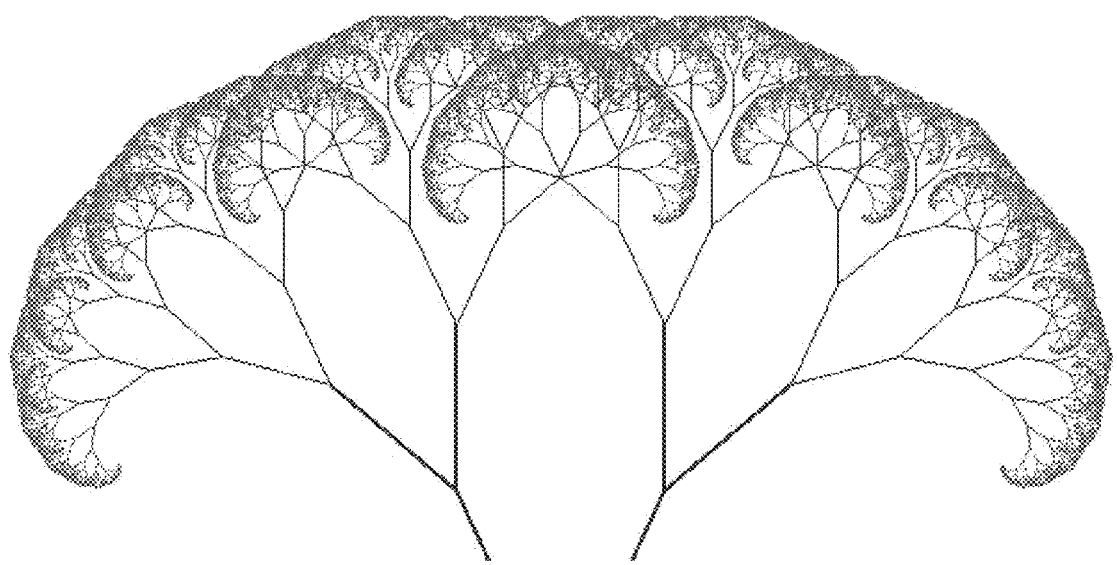
FIGS. 9A-9B illustrate example data objects that may be generated by a system configured in accordance with the pseudocode shown in FIG. 8.
Figure 9B:
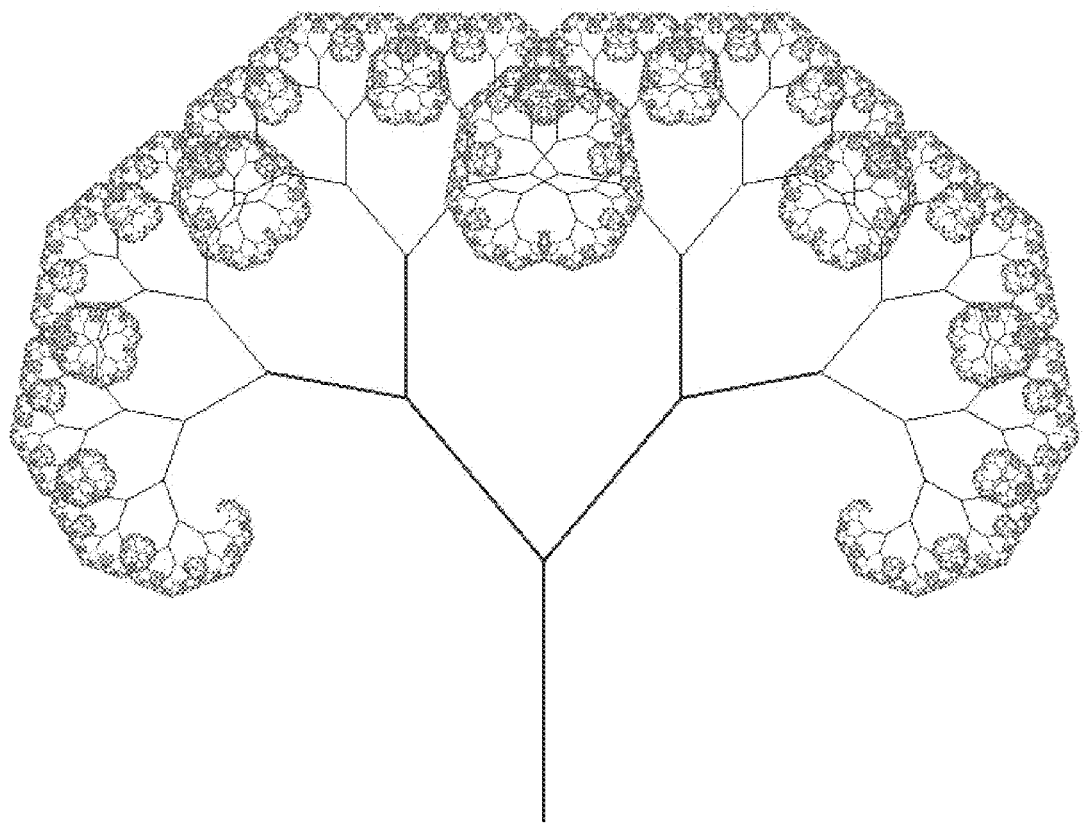

FIG. 9A-9B illustrates examples of fractal image objects generated in accordance with the methods described herein. The image shown in FIG. 9A may be generated using the pseudocode shown in FIG. 8. The image shown in FIG. 9B can be generated by adjusting the ANGLE variable in the code shown in FIG. 8.

FIGS. 17A-17E illustrate an example of pseudocode representing user inputs in a virtual reality system. The user inputs specified in FIGS. 17A-17E can be more efficiently and simply modified using the six-dimensional transformations within an alternate six-dimensional geometric algebra, such as the Clifford algebra Cl(3,3) described herein above.

Figure 18:
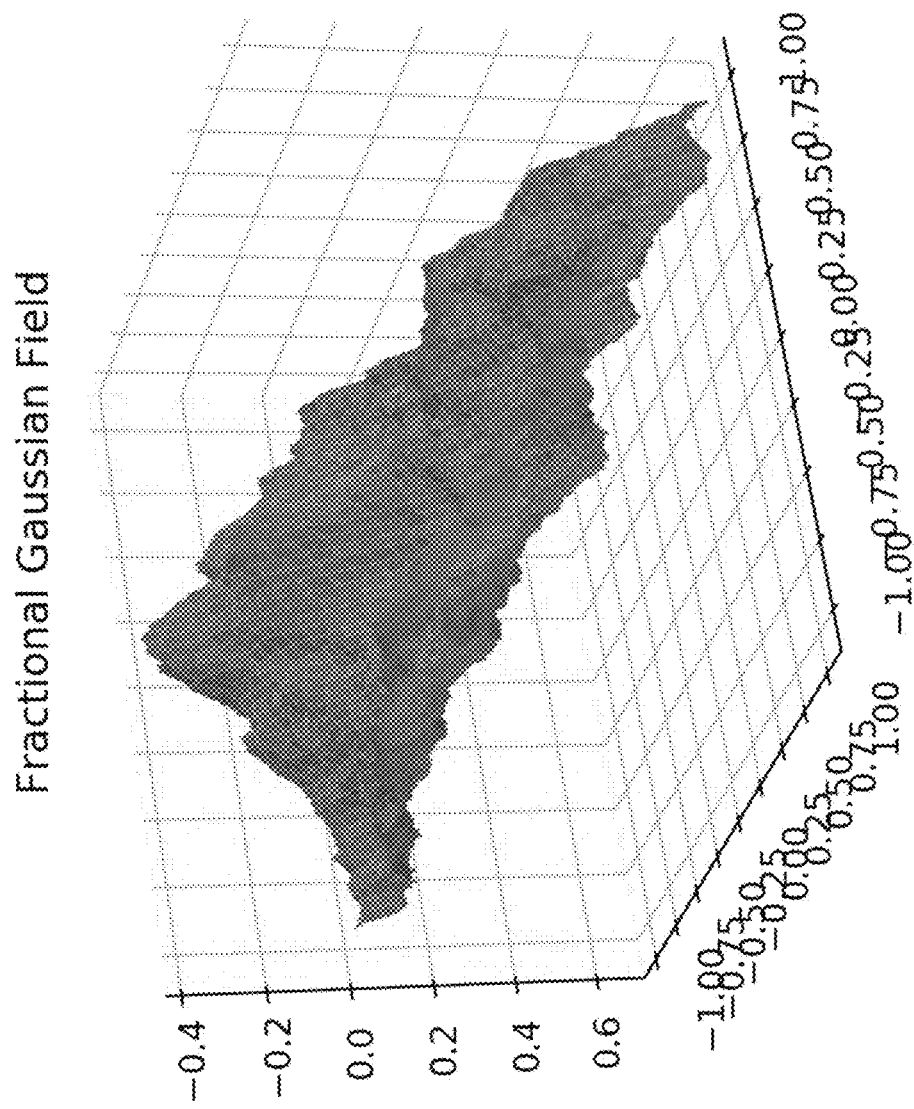
FIG. 18 is an example illustration of image data that may be generated using an example data processing method in accordance with an embodiment.

FIG. 18 illustrates an example of a Brownian mountain data object that may be generated using pseudocode similar to that shown in FIGS. 17A-17E. The Brownian mountain illustrated in FIG. 18 can be generated as a time slice of Brownian motion in a three dimensional time space $\mathbb{R}^3$. That is, the Brownian mountain may be generated as a time slice of Brownian motion in the split signature space $\mathbb{R}^{3,3}$ described herein above. Varying 'sharpness' of mountain terrains can be generated using different Hurst exponents to the fractional Brownian motions in the six-dimensional space $\mathbb{R}^{3,3}$. The sharpness may also depend on the 'slope' of the time slice in the three dimensional time space. This may enable a large and potentially infinite number of different mountain landscape image objects to be generated from a projection of a single 'universal' six-dimensional mountain object.

Figure 19:
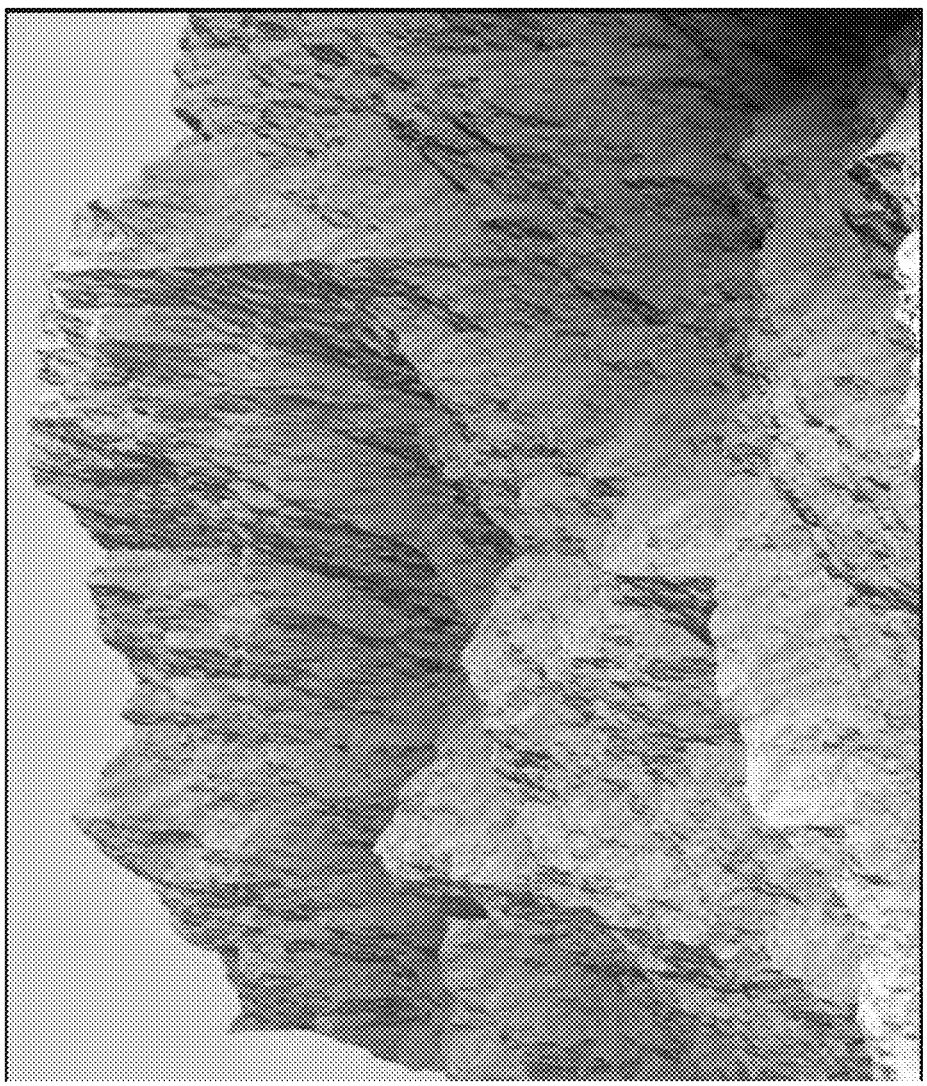
FIG. 19 is another example illustration of image data that may be generated using an example data processing method in accordance with an embodiment.

FIG. 19 illustrates another example of a Brownian mountain data object that may be generated using the methods described herein. The Brownian mountain data object may be generated in Python using the example code illustrated in Table 4 below:

TABLE 4

Example Python code for Generating Brownian Mountain

```
import numpy, random
    from mayavi import mlab
    levels = 11
    size = 2 ** (levels - 1)
    height = numpy.zeros((size + 1, size + 1))
    for lev in range(levels):
    step = size // 2 ** lev
    for y in range(0, size + 1, step):
    jumpover = 1 - (y // step) % 2 if lev > 0 else 0
    for x in range(step * jumpover, size + 1, step * (1 + jumpover)):
    pointer = 1 - (x // step) % 2 + 2 * jumpover if lev > 0 else 3
    yref, xref = step * (1 - pointer // 2), step * (1 - pointer % 2)
    corner1 = height[y - yref, x - xref]
    corner2 = height[y + yref, x + xref]
    average = (corner1 + corner2) / 2.0
    variation = step * (random.random( ) - 0.5)
    height[y,x] = average + variation if lev > 0 else 0
    xg, yg = numpy.mgrid[-1:1:1j*size,-1:1:1j*size]
    surf = mlab.surf(xg, yg, height, colormap='gist_earth', warp_scale='auto')
    mlab.show( )
```

In embodiments described herein, transformations that are used in various data processing applications, such as image generation and virtual reality applications, can be mapped onto vectors in a six-dimensional space. The transformations may then be performed within the six-dimensional space. For example, the transformations may be performed using a split signature space-time and conformal Clifford algebra Cl(3,3). The mappings to six-dimensional space described herein may provide a universal framework for generating computer graphic images using various different techniques, such as L-systems and turtles, or general fractal set iterations. three-dimensional fractal geometry and higher dimensional slices can be computed using six-dimensional hypercomplex algebras. Image rendering using three-dimensional turtles can also be more quickly and conveniently expressed using some of the transformations from the mapping to $\mathbb{R}^{3,3}$ using six-dimensional geometric algebras.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A data processing method comprising:
receiving an initial data set, wherein the initial data set comprises at least one data object that is defined within a first dimensional space, the first dimensional space having at most four dimensions;
receiving a data processing input for the initial data set, wherein the data processing input defines at least one operation to be performed on the at least one data object;
determining, from the data processing input, a set of data transformations to be performed on the at least one data object, the set of data transformations comprising at least one initial data transformation defined in the first dimensional space;
defining a six-dimensional set of data transformations by mapping each initial data transformation in the set of data transformations to a corresponding six-dimensional transformation, wherein each six-dimensional transformation is defined in a six-dimensional coordinate system, wherein the six-dimensional coordinate system is defined with a split signature that includes a first three dimensional subspace and a second three dimensional subspace, wherein the first three dimensional subspace and the second three dimensional subspace are disjoint;
calculating an updated data set by applying the six-dimensional set of data transformations to the at least one data object; and
at least one of storing the updated data set as a processed data set in a non-transitory storage medium or outputting the updated data set.

2. The method of claim 1, wherein the first dimensional space comprises fewer than four dimensions, and mapping each initial data transformation in the set of data transformations to the corresponding six-dimensional transformation comprises:
mapping each initial data transformation into a corresponding four-dimensional transformation that is defined in a homogenous four-dimensional space; and
mapping each four-dimensional transformation to the corresponding six-dimensional transformation.

3. The method of claim 2, wherein the dimensions of the six-dimensional coordinate system are determined using bivectors calculated as the exterior products of the unit coordinate vectors of the four-dimensional coordinate system.

4. The method of claim 1, wherein the six-dimensional coordinate system is a six-dimensional metric space.

5. The method of claim 4, wherein mapping each initial data transformation in the set of data transformations to the corresponding six-dimensional transformation comprises:
mapping each initial data transformation into an initial six-dimensional transformation that is defined in an initial six-dimensional coordinate system; and
mapping each initial six-dimensional transformation to the corresponding six-dimensional transformation by converting the initial six-dimensional coordinate system to the six-dimensional metric space.

6. The method of claim 5, wherein the first dimensional space comprises fewer than four dimensions, and mapping each initial data transformation in the set of data transformations into the initial six-dimensional transformation comprises:
mapping each initial data transformation into a corresponding four-dimensional transformation that is defined in a homogenous four-dimensional space; and
mapping each four-dimensional transformation to the initial six-dimensional transformation.

7. The method of claim 6, wherein the dimensions of the initial six-dimensional transformation are defined using null vectors that are determined using bivectors calculated as the exterior products of the unit coordinate vectors of the four-dimensional space.

8. The method of claim 7, wherein the dimensions of the six-dimensional transformations are defined using unit vectors that are calculated using the null vectors dimensions of the initial six-dimensional coordinate system.

9. The method of claim 1, wherein:
the set of data transformations is determined to be a sequence of data transformations, wherein the sequence of data transformations includes a plurality of data transformations and the sequence of data transformations defines a sequential order for the plurality of data transformations; and
calculating the updated data set comprises:
applying each of the six-dimensional transformations to the at least one initial data object in the sequential order defined by the data processing input.

10. The method of claim 9, wherein applying each of the six-dimensional transformations to the at least one data image object comprises:
applying an initial six-dimensional transformation to the at least one data object, the initial six-dimensional transformation defined as a first data transformation in the sequential order;
calculating an intermediate updated data set, the intermediate updated data set comprising the result of applying the six-dimensional transformation to the at least one data object;
applying a subsequent six-dimensional transformation to the intermediate updated data set, the subsequent six-dimensional transformation defined as the subsequent image transformation in the sequential order; and
repeating the calculating and applying steps until the six-dimensional transformations corresponding to all of the transformations in the sequence of data transformations have been applied.

11. The method of claim 1, wherein the data processing input defines the set of data transformations.

12. The method of claim 1, wherein:
the data processing input comprises the at least one data object; and
determining the set of data transformations comprises:
analyzing the at least one data object to identify a data generation sequence for the at least one data object;
determining a predicted sequence of subsequent modifications to the data object based on the identified data generation sequence;
defining the set of data transformations using the predicted sequence of subsequent modifications.

13. The method of claim 1, wherein:
the updated data set comprises updated image data; and
outputting the updated data set comprises rendering the updated image data for one of a video display application, an augmented reality application, and a virtual reality application.

14. A computer program product comprising a non-transitory computer-readable storing computer executable instructions, the computer executable instructions for configuring a processor to perform a data processing method, wherein the method comprises:
receiving an initial data set, wherein the initial data set comprises at least one data object that is defined within a first dimensional space, the first dimensional space having at most four dimensions;
receiving a data processing input for the initial data set, wherein the data processing input defines at least one operation to be performed on the at least one data object;
determining, from the data processing input, a set of data transformations to be performed on the at least one data object, the set of data transformations comprising at least one initial data transformation defined in the first dimensional space;
defining a six-dimensional set of data transformations by mapping each initial data transformation in the set of data transformations to a corresponding six-dimensional transformation, wherein each six-dimensional transformation is defined in a six-dimensional coordinate system, wherein the six-dimensional coordinate system is defined with a split signature that includes a first three dimensional subspace and a second three dimensional subspace, wherein the first three dimensional subspace and the second three dimensional subspace are disjoint;
calculating an updated data set by applying the six-dimensional set of data transformations to the at least one data object; and
at least one of storing the updated data set as a processed data set in a non-transitory storage medium or outputting the updated data set.

15. The computer program product of claim 14, wherein the first dimensional space comprises fewer than four dimensions, and mapping each initial data transformation in the set of data transformations to the corresponding six-dimensional transformation comprises:
mapping each initial data transformation into a corresponding four-dimensional transformation that is defined in a homogenous four-dimensional space; and
mapping each four-dimensional transformation to the corresponding six-dimensional transformation.

16. The computer program product of claim 15, wherein the dimensions of the six-dimensional coordinate system are determined using bivectors calculated as the exterior products of the unit coordinate vectors of the four-dimensional coordinate system.

17. The computer program product of claim 14, wherein the six-dimensional coordinate system is a six-dimensional metric space.

18. The computer program product of claim 17, wherein mapping each initial data transformation in the set of data transformations to the corresponding six-dimensional transformation comprises:
   mapping each initial data transformation into an initial six-dimensional transformation that is defined in an initial six-dimensional coordinate system; and
   mapping each initial six-dimensional transformation to the corresponding six-dimensional transformation by converting the initial six-dimensional coordinate system to the six-dimensional metric space.

19. The computer program product of claim 18, wherein the first dimensional space comprises fewer than four dimensions, and mapping each initial data transformation in the set of data transformations into the initial six-dimensional transformation comprises:
   mapping each initial data transformation into a corresponding four-dimensional transformation that is defined in a homogenous four-dimensional space; and
   mapping each four-dimensional transformation to the initial six-dimensional transformation.

20. The computer program product of claim 19, wherein the dimensions of the initial six-dimensional transformation are defined using null vectors that are determined using bivectors calculated as the exterior products of the unit coordinate vectors of the four-dimensional space.

21. The computer program product of claim 20, wherein the dimensions of the six-dimensional transformations are defined using unit vectors that are calculated using the null vectors dimensions of the initial six-dimensional coordinate system.

22. The computer program product of claim 14, wherein:
   the set of data transformations is determined to be a sequence of data transformations, wherein the sequence of data transformations includes a plurality of data transformations and the sequence of data transformations defines a sequential order for the plurality of data transformations; and
   calculating the updated data set comprises:
      applying each of the six-dimensional transformations to the at least one initial data object in the sequential order defined by the data processing input.

23. The computer program product of claim 22, wherein applying each of the six-dimensional transformations to the at least one data image object comprises:
   applying an initial six-dimensional transformation to the at least one data object, the initial six-dimensional transformation defined as a first data transformation in the sequential order;
   calculating an intermediate updated data set, the intermediate updated data set comprising the result of applying the six-dimensional transformation to the at least one data object;
   applying a subsequent six-dimensional transformation to the intermediate updated data set, the subsequent six-dimensional transformation defined as the subsequent image transformation in the sequential order; and
   repeating the calculating and applying steps until the six-dimensional transformations corresponding to all of the transformations in the sequence of data transformations have been applied.

24. The computer program product of claim 14, wherein the data processing input defines the set of data transformations.

25. The computer program product of claim 14, wherein:
   the data processing input comprises the at least one data object; and
   determining the set of data transformations comprises:
   analyzing the at least one data object to identify a data generation sequence for the at least one data object;
   determining a predicted sequence of subsequent modifications to the data object based on the identified data generation sequence;
   defining the set of data transformations using the predicted sequence of subsequent modifications.

26. The computer program product of claim 14, wherein:
   the updated data set comprises updated image data; and
   outputting the updated data set comprises rendering the updated image data for one of a video display application, an augmented reality application, and a virtual reality application.

* * * * *